United States Patent
Zhang

(10) Patent No.: US 11,876,736 B2
(45) Date of Patent: Jan. 16, 2024

(54) ALLOCATING THE SAME TIME-FREQUENCY RESOURCES TO DIFFERENT UES BASED ON ORTHOGONAL BEAMS ASSIGNED TO THE DIFFERENT UES

(71) Applicant: HUAWEI TECHNOLOGIES CO., LTD., Guangdong (CN)

(72) Inventor: Pengcheng Zhang, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 417 days.

(21) Appl. No.: 17/126,473

(22) Filed: Dec. 18, 2020

(65) Prior Publication Data
US 2021/0111843 A1    Apr. 15, 2021

Related U.S. Application Data

(63) Continuation of application No. PCT/CN2019/088613, filed on May 27, 2019.

(30) Foreign Application Priority Data

Jun. 20, 2018   (CN) ......................... 201810636394.8

(51) Int. Cl.
*H04W 72/0446*  (2023.01)
*H04W 72/0453*  (2023.01)
(Continued)

(52) U.S. Cl.
CPC ............ *H04L 5/0007* (2013.01); *H04L 5/003* (2013.01); *H04L 5/0023* (2013.01);
(Continued)

(58) Field of Classification Search
CPC ..... H04L 5/0007; H04L 5/0023; H04L 5/003; H04L 5/0005; H04L 25/0224;
(Continued)

(56) References Cited

U.S. PATENT DOCUMENTS

2014/0254421 A1\* 9/2014 Ahlander ............ H04L 25/0202
370/252
2014/0314018 A1   10/2014 Gao et al.
(Continued)

FOREIGN PATENT DOCUMENTS

CN   103931128 A    7/2014
CN   104968051 A   10/2015
(Continued)

OTHER PUBLICATIONS

"Attribute," webpage <https://www.merriam-webster.com/dictionary/attribute>, 1 page, Sep. 10, 2017, retrieved from Internet Archive Wayback Machine <https://web.archive.org/web/20170910024938/https://www.merriam-webster.com/dictionary/attribute> on Mar. 8, 2023. (Year: 2017).\*

(Continued)

*Primary Examiner* — Un C Cho
*Assistant Examiner* — Lalita W Pace
(74) *Attorney, Agent, or Firm* — WOMBLE BOND DICKINSON (US) LLP

(57) ABSTRACT

A time-frequency resource allocation method includes: obtaining an uplink reference signal of user equipment (UE) on which allocation is to be performed when scheduling a time-frequency resource for the UE; measuring, based on the obtained uplink reference signal, each beam in a second preset quantity of orthogonal beam groups including a first preset quantity of beams, to determine a level of each beam; then determining, based on the level of each beam, a beam attribute that is of the UE and that is in the second preset quantity of orthogonal beam groups; and then, allocating, based on the beam attribute that is of the UE and a beam attribute that is of one or more UEs on which allocation has already been performed and that is in the second preset (Continued)

quantity of orthogonal beam groups, the time-frequency resource to the UE on which allocation is to be performed.

20 Claims, 5 Drawing Sheets

(51) Int. Cl.
  *H04L 5/00* (2006.01)
  *H04W 72/044* (2023.01)
  *H04W 72/21* (2023.01)
  *H04L 25/02* (2006.01)
  *H04W 72/542* (2023.01)
(52) U.S. Cl.
  CPC ....... *H04L 25/0224* (2013.01); *H04W 72/044* (2013.01); *H04W 72/046* (2013.01); *H04W 72/0446* (2013.01); *H04W 72/0453* (2013.01); *H04W 72/21* (2023.01); *H04W 72/542* (2023.01)
(58) Field of Classification Search
  CPC . H04L 25/0228; H04L 5/0228; H04L 5/0051; H04L 5/005; H04L 5/0048; H04W 72/044; H04W 72/0446; H04W 72/0453; H04W 72/046; H04W 72/21; H04W 72/542; H04W 72/0457; H04W 16/28
  See application file for complete search history.

(56) References Cited

U.S. PATENT DOCUMENTS

| | | | |
|---|---|---|---|
| 2015/0365142 | A1 | 12/2015 | Chai et al. |
| 2016/0100413 | A1* | 4/2016 | Hwang ................ H04B 7/0452 370/330 |
| 2018/0205440 | A1* | 7/2018 | Enescu ................ H04B 7/0626 |
| 2020/0162133 | A1* | 5/2020 | Harrison ............. H04L 25/0226 |

FOREIGN PATENT DOCUMENTS

| | | | | |
|---|---|---|---|---|
| CN | 105790913 | A | 7/2016 | |
| CN | 106464322 | A | 2/2017 | |
| CN | 106954260 | A | 7/2017 | |
| EP | 2819313 | B1 | 11/2019 | |
| JP | 2015513257 | A | 4/2015 | |
| WO | 2015077985 | A1 | 6/2015 | |
| WO | WO-2015191530 | A2 * | 12/2015 | ........... H04B 17/318 |
| WO | 2018082528 | A1 | 5/2018 | |

OTHER PUBLICATIONS

Zte et al., "Group based beam management for NR-MIMO", 3GPP TSG RAN WG1 Meeting #88, R1-1701798, Athens, Greece, Feb. 13-17, 2017, total 9 pages.

* cited by examiner

US 11,876,736 B2

1

ALLOCATING THE SAME TIME-FREQUENCY RESOURCES TO DIFFERENT UES BASED ON ORTHOGONAL BEAMS ASSIGNED TO THE DIFFERENT UES

CROSS-REFERENCE TO RELATED APPLICATIONS

This application is a continuation of International Application No. PCT/CN2019/088613, filed on May 27, 2019, which claims priority to Chinese Patent Application No. 201810636394.8, filed on Jun. 20, 2018. The disclosures of the aforementioned applications are hereby incorporated by reference in their entireties.

TECHNICAL FIELD

This application relates to the field of communications technologies, and in particular, to a time-frequency resource allocation method and apparatus.

BACKGROUND

With the development of communications technologies, more 4G user equipments (UE) emerge, and higher requirements are imposed on network coverage and quality. To implement deep network coverage and improve network quality, a soft split technology is used without adding new devices (such as base stations) and with limited time-frequency resources, to improve the network coverage and network capacity. The soft split technology properly splits sectors of a base station to increase a quantity of sectors of the base station. More carriers are allocated in coverage of the increased sectors. An increase in a quantity of the carriers brings an increase in a user equipment quantity. Therefore, network expansion can be implemented, a beam of a sector obtained after splitting is narrower, and the coverage is larger.

In a related technology, the soft split technology usually changes a conventional three-sector base station to a six-cell base station by adjusting a phase weight and an amplitude of an antenna. The soft split technology may include intra-frequency soft split. Through intra-frequency soft split, one cell is split into two cells with symmetric coverage, and UE in the two cells obtained after splitting may use a same time-frequency resource. That is, spatial multiplexing on time-frequency resources of the two cells is implemented. For example, a cell on an F frequency band (with a frequency range of 20 M) may be split into two neighboring intra-frequency cells through intra-frequency soft split. An available frequency band of the two neighboring intra-frequency cells obtained after splitting is 20 M+20 M. After intra-frequency soft split, the base station separately schedules time-frequency resources for the two cells.

In a process of implementing this application, the inventors find that the related technology has at least the following problems:

The coverage of the two cells obtained after splitting are symmetrical, but UE distribution in the two cells may not be symmetrical. There may be more UEs in one cell than the other cell (for example, a cell 1 has 10 UEs and a cell 2 has only one UE). In this case, although two time-frequency resources are spatial multiplexed, the base station separately schedules the time-frequency resources for the two cells. As a result, the time-frequency resource of the cell with fewer UEs is not effectively used.

SUMMARY

To resolve a problem in a related technology, embodiments of the present disclosure provide a time-frequency resource allocation method and apparatus. The technical solutions are as follows.

According to a first aspect, a time-frequency resource allocation method is provided. The method includes:

obtaining an uplink reference signal of user equipment UE on which allocation is to be performed, where the uplink reference signal includes an uplink channel sounding reference signal SRS and/or a specific reference signal DMRS; measuring, based on the uplink reference signal, each beam in a second preset quantity of orthogonal beam groups including a first preset quantity of beams, to determine a level of each beam; determining, based on the level of each beam, a beam attribute that is of the UE on which allocation is to be performed and that is in the second preset quantity of orthogonal beam groups; and allocating, based on the beam attribute that is of the UE on which allocation is to be performed and that is in the second preset quantity of orthogonal beam groups and a beam attribute that is of one or more UEs on which allocation has already been performed and that is in the second preset quantity of orthogonal beam groups, a time-frequency resource to the UE on which allocation is to be performed, where the UEs on which allocation has already been performed use a same time-frequency resource, and the same time-frequency resource is a same time-frequency resource block RB or a same time-frequency resource block group RBG.

The orthogonal beam group means that a plurality of included beams do not interfere with each other, or interference between a plurality of beams is less than a specific threshold and does not affect normal data sending and receiving. The first preset quantity of beams may be configured by a skilled person based on a status of an antenna of a base station. The first preset quantity of beams may form the second preset quantity of orthogonal beam groups through adjustment of a weighting coefficient, an amplitude, and the like of the antenna of the base station. For example, there are M beams in total. Each time the weighting coefficient and the amplitude of the antenna of the base station are adjusted, M other beams may be generated based on the M beams, and the M generated beams are orthogonal to the M beams. N orthogonal beam groups are obtained through N−1 times of adjustment, and the second preset quantity is N. The level refers to an equivalent power of the beam.

In the solution shown in this embodiment of the present disclosure, when the base station is to transmit data to the UE in a cell obtained after splitting, or when the UE in a cell obtained after splitting is to transmit data to the base station, the base station needs to allocate, to the UE, the time-frequency resource for user data transmission. When allocating the time-frequency resource, the base station may obtain the uplink reference signal of the UE on which allocation is to be performed. The uplink reference signal includes the uplink channel sounding reference signal (SRS) and/or the specific reference signal (DMRS). The SRS is usually periodically transmitted by the UE to the base station, is used by the base station to perform uplink channel estimation, and is usually transmitted in the last symbol of a subframe. The DMRS is usually transmitted only in a resource block (RB) allocated for transmission of a UE-specific physical downlink shared channel (PDSCH).

If the base station has received an SRS sent by the UE on which allocation is to be performed in a current periodicity, the base station may obtain the SRS in the current periodicity; or if the base station does not receive an SRS sent by the UE on which allocation is to be performed in a current periodicity, the base station may obtain an SRS sent by the UE on which allocation is to be performed in a previous periodicity. In addition, the base station may obtain a DMRS used when the UE on which allocation is to be performed transmits data last time.

Then, the base station may measure any beam in each orthogonal beam group based on the obtained uplink reference signal, to obtain a level of any beam.

After determining the level of each beam in each orthogonal beam group, the base station may determine a beam attribute that is of the UE on which allocation is to be performed and that is in each orthogonal beam group based on the level of each beam. Finally, after the base station determines the beam attribute that is of the UE on which allocation is to be performed and that is in each orthogonal beam group, the base station may obtain the UEs on which allocation has already been performed on the same time-frequency resource (where the UEs on which allocation has already been performed and the UE on which allocation is to be performed belong to a same cell or two cells obtained after splitting), and then obtain a beam attribute that is of the UEs on which allocation has already been performed and that is in each of the second preset quantity of beam groups (where a determining method is the same as the foregoing method for determining the beam attribute of the UE on which allocation is to be performed, and details are not described herein again). Then, the base station allocates, based on the beam attribute of the UE on which allocation is to be performed and the beam attribute of the UEs on which allocation has already been performed, the time-frequency resource to the UE on which allocation is to be performed.

In an embodiment, the measuring, based on the uplink reference signal, each beam in a second preset quantity of orthogonal beam groups including a first preset quantity of beams, to determine a level of each beam includes: measuring, based on the uplink reference signal, each beam in the second preset quantity of orthogonal beam groups including the first preset quantity of beams, to determine an equivalent channel response of each beam; and determining the level of each beam based on the equivalent channel response of each beam.

In an embodiment, the base station may determine an equivalent channel response of each beam in any of the second preset quantity of orthogonal beam groups. In this way, the equivalent channel response of each beam in each orthogonal beam group can be obtained, and the level of each beam is determined based on the equivalent channel response of each beam in each orthogonal beam group.

In an embodiment, the determining, based on the level of each beam, a beam attribute that is of the UE on which allocation is to be performed and that is in the second preset quantity of orthogonal beam groups includes: for each orthogonal beam group, if a target beam satisfying a preset condition exists in the orthogonal beam group, determining that a beam attribute that is of the UE on which allocation is to be performed and that is in the orthogonal beam group is the target beam; or if no beam satisfying a preset condition exists in the orthogonal beam group, determining that a beam attribute that is of the UE on which allocation is to be performed and that is in the orthogonal beam group is a joint attribute, where the preset condition is that a difference between a level of the target beam and a level of any other beam than the target beam in the orthogonal beam group is greater than or equal to a preset value.

The preset condition may be preset and stored in the base station. The preset condition is that the difference between the level of the target beam and the level of any other beam than the target beam in the orthogonal beam group is greater than the preset value. There are one or more target beams. The preset value may be preset and stored in the base station, and is used to measure a correlation between beams.

In the solution in this embodiment of the present disclosure, the base station may compare levels of beams in any orthogonal beam group. If the difference between the level of the target beam in the orthogonal beam group and the level of any other beam than the target beam in the orthogonal beam group is greater than or equal to the preset value, the base station determines that the beam attribute that is of the UE on which allocation is to be performed and that is in the orthogonal beam group is the target beam.

For example, in an orthogonal beam group, if a difference between a level of a beam x (the target beam) with a highest level and a level of any other beam is greater than or equal to the preset value, a beam attribute of the UE on which allocation is to be performed is the beam x; or if a difference between a level of each of a plurality of beams x and y with higher levels and a level of any other beam is greater than or equal to the preset value, it is determined that beam attributes of the UE on which allocation is to be performed are the beam x and the beam y. If no beam satisfying the preset condition exists in the orthogonal beam group, it may be determined that the beam attribute that is of the UE on which allocation is to be performed and that is in the orthogonal beam group is the joint attribute.

In an embodiment, time-frequency resources allocated to the UE on which allocation is to be performed and the UEs on which allocation has already been performed are used for downlink transmission; and the allocating, based on the beam attribute that is of the UE on which allocation is to be performed and that is in the second preset quantity of orthogonal beam groups and a beam attribute that is of one or more UEs on which allocation has already been performed and that is in the second preset quantity of orthogonal beam groups, a time-frequency resource to the UE on which allocation is to be performed includes: determining a transmission mode of the UE on which allocation is to be performed and a transmission mode of the UEs on which allocation has already been performed; and allocating, based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, the time-frequency resource to the UE on which allocation is to be performed.

When the base station transmits downlink data to the UE, transmission modes usually include a multiple-input multiple-output (MIMO) transmission mode, a beamforming (BF) transmission mode, a transmit diversity transmission mode, and the like. In this embodiment of the present disclosure, the mentioned transmission mode is a downlink transmission mode, and is usually the cell-specific reference signal (CRS)-based MIMO transmission mode or the BF transmission mode.

In an embodiment, the base station may determine the transmission mode of the UE based on a reference signal used for demodulation. If demodulation is performed based on a CRS, the base station determines that the UE uses the CRS-based MIMO transmission mode; or if demodulation is performed based on the DMRS of the UE, the base station determines that the UE uses the BF transmission mode. The base station may determine the transmission modes of the UE on which allocation is to be performed and the UEs on which allocation has already been performed according to this principle, and then allocate, based on the transmission mode of the UE on which allocation is to be performed, the transmission mode of the UEs on which allocation has already been performed, and the beam attributes that are of the UE on which allocation is to be performed and the UEs on which allocation has already been performed and that are in the second preset quantity of orthogonal beam groups, the time-frequency resource to the UE on which allocation is to be performed.

In an embodiment, the allocating, based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, the time-frequency resource to the UE on which allocation is to be performed includes: if that the UE on which allocation is to be performed and the UEs on which allocation has already been performed satisfy an orthogonal matching condition is determined based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, a time-frequency resource in the same time-frequency resource to which the time-frequency resource allocated to the UEs on which allocation has already been performed belongs.

The orthogonal matching condition is a condition satisfied by two UEs that do not interfere with each other when downlink data is transmitted on the same time-frequency resource.

In the solution in this embodiment of the present disclosure, the base station may determine, based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, whether the UE on which allocation is to be performed and the UEs on which allocation has already been performed satisfy the orthogonal matching condition. If the UE on which allocation is to be performed and the UEs on which allocation has already been performed satisfy the orthogonal matching condition, it indicates that a correlation between the UE on which allocation is to be performed and any UE in the UEs on which allocation has already been performed is relatively low, and the UE on which allocation is to be performed and any UE in the UEs on which allocation has already been performed do not affect each other. In this way, the time-frequency resource in the same time-frequency resource to which the time-frequency resource allocated to the UEs on which allocation has already been performed belongs can be allocated to the UE on which allocation is to be performed. In addition, if the UE on which allocation is to be performed and the UEs on which allocation has already been performed do not satisfy the orthogonal matching condition (the UE on which allocation is to be performed and one of the UEs on which allocation has already been performed do not satisfy the orthogonal matching condition), it indicates that a correlation between the UE on which allocation is to be performed and the UE in the UEs on which allocation has already been performed is relatively high, and the UE on which allocation is to be performed and the UE in the UEs on which allocation has already been performed may affect each other in data receiving and demodulation. Consequently, the time-frequency resource in the same time-frequency resource to which the time-frequency resource allocated to the UEs on which allocation has already been performed belongs cannot be allocated to the UE on which allocation is to be performed.

In an embodiment, the if that the UE on which allocation is to be performed and the UEs on which allocation has already been performed satisfy an orthogonal matching condition is determined based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, a time-frequency resource in the same time-frequency resource to which the time-frequency resource allocated to the UEs on which allocation has already been performed belongs includes: if at least one UE using a cell-specific reference signal CRS-based multiple-input multiple-output MIMO transmission mode exists in the UE on which allocation is to be performed and the UEs on which allocation has already been performed, obtaining a physical cell identifier PCI of a cell to which the UE on which allocation is to be performed belongs and a PCI of a cell to which the UEs on which allocation has already been performed belong; and if that the UE on which allocation is to be performed and the UEs on which allocation has already been performed satisfy the orthogonal matching condition is determined based on the beam attribute that is of the UE on which allocation is to be performed and that is in the second preset quantity of orthogonal beam groups, the beam attribute that is of the UEs on which allocation has already been performed and that is in the second preset quantity of orthogonal beam groups, the PCI of the cell to which the UE on which allocation is to be performed belongs, and the PCI of the cell to which the UEs on which allocation has already been performed belong, allocating, to the UE on which allocation is to be performed, the time-frequency resource in the same time-frequency resource to which the time-frequency resource allocated to the UEs on which allocation has already been performed belongs.

In an embodiment, when UE accesses an LTE network, the base station records a physical cell identifier (PCI) of a cell to which the UE belongs. Therefore, the base station may obtain, from a storage location for pre-recording PCIs, the PCIs of the cells to which the UE on which allocation is to be performed and the UEs on which allocation has already been performed belong. After determining the transmission modes of the UE on which allocation is to be performed and the UEs on which allocation has already been performed, the base station may determine whether at least one UE using the CRS-based MIMO transmission mode exists in the UE on which allocation is to be performed and the UEs on which allocation has already been performed; if yes, obtain the PCI of the cell to which the UE on which allocation is to be performed belongs, and the PCI of the cell to which the UEs on which allocation has already been performed belong; and then determine, based on the obtained PCIs, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, whether the UE on which allocation is to be performed and the UEs on which allocation has already been performed satisfy the orthogonal matching condition. If the orthogonal matching condition is satisfied, the time-frequency resource in the same time-frequency resource to which the time-frequency resource allocated to the UEs on which allocation has already been performed belongs can be allocated to the UE on which allocation is to be performed.

In an embodiment, the if that the UE on which allocation is to be performed and the UEs on which allocation has already been performed satisfy the orthogonal matching condition is determined based on the beam attribute that is of the UE on which allocation is to be performed and that is in the second preset quantity of orthogonal beam groups, the beam attribute that is of the UEs on which allocation has already been performed and that is in the second preset quantity of orthogonal beam groups, the PCI of the cell to which the UE on which allocation is to be performed belongs, and the PCI of the cell to which the UEs on which allocation has already been performed belong, allocating, to the UE on which allocation is to be performed, the time-frequency resource in the same time-frequency resource to which the time-frequency resource allocated to the UEs on which allocation has already been performed belongs includes: after that the UE on which allocation is to be performed and the UEs on which allocation has already been performed satisfy the orthogonal matching condition is determined if the transmission mode of the UE on which allocation is to be performed is the MIMO transmission mode, the PCI of the cell to which the UE on which allocation is to be performed belongs is different from a PCI of a cell to which UE that is in the UEs on which allocation has already been performed and whose transmission mode is the MIMO transmission mode belongs, the PCI of the cell to which the UE on which allocation is to be performed belongs is different from a PCI of a cell to which UE that is in the UEs on which allocation has already been performed and whose transmission mode is a BF transmission mode belongs, and in at least one of the second preset quantity of orthogonal beam groups, neither a beam attribute of the UE on which allocation is to be performed nor a beam attribute of first UE in the UEs on which allocation has already been performed is the joint attribute, and the beam attribute of the UE on which allocation is to be performed is completely different from the beam attribute of the first UE, allocating, to the UE on which allocation is to be performed, the time-frequency resource in the same time-frequency resource to which the time-frequency resource allocated to the UEs on which allocation has already been performed belongs, where the first UE is any UE in the UEs on which allocation has already been performed; or after that the UE on which allocation is to be performed and the UEs on which allocation has already been performed satisfy the orthogonal matching condition is determined if the transmission mode of the UE on which allocation is to be performed is a BF transmission mode, the PCI of the cell to which the UE on which allocation is to be performed belongs is different from a PCI of a cell to which UE that is in the UEs on which allocation has already been performed and whose transmission mode is the MIMO transmission mode belongs, and in at least one of the second preset quantity of orthogonal beam groups, neither a beam attribute of the UE on which allocation is to be performed nor a beam attribute of second UE in the UEs on which allocation has already been performed is the joint attribute, and the beam attribute of the UE on which allocation is to be performed is completely different from the beam attribute of the UEs on which allocation has already been performed, allocating, to the UE on which allocation is to be performed, the time-frequency resource in the same time-frequency resource to which the time-frequency resource allocated to the UEs on which allocation has already been performed belongs, where the second UE is any UE in the UEs on which allocation has already been performed.

In an embodiment, if the transmission mode of the UE on which allocation is to be performed is the CRS-based MIMO transmission mode, the base station may determine the PCI of the cell to which the UE that is in the UEs on which allocation has already been performed and whose transmission mode is the CRS-based MIMO transmission mode belongs. If the PCI of the cell to which the UE on which allocation is to be performed belongs is different from the PCI of the cell to which the UE that is in the UEs on which allocation has already been performed and whose transmission mode is the CRS-based MIMO transmission mode belongs, the base station may determine the PCI of the cell to which the UE that is in the UEs on which allocation has already been performed and whose transmission mode is the BF transmission mode belongs. If determining that the PCI of the cell to which the UE on which allocation is to be performed belongs is different from the PCI of the cell to which the UE that is in the UEs on which allocation has already been performed and whose transmission mode is the BF transmission mode belongs (in other words, the transmission mode of the UE on which allocation is to be performed is the CRS-based MIMO transmission mode, and no UE whose PCI is the same as the PCI of the cell to which the UE on which allocation is to be performed belongs exists in the UEs on which allocation has already been performed), the base station may match the beam attribute of the UE on which allocation is to be performed with a beam attribute of any UE (namely, the first UE) in the UEs on which allocation has already been performed. A matching principle may be as follows: If in at least one of the second preset quantity of orthogonal beam groups, neither the beam attribute of the UE on which allocation is to be performed nor the beam attribute of the first UE in the UEs on which allocation has already been performed is the joint attribute, and the beam attribute of the UE on which allocation is to be performed is completely different from the beam attribute of the first UE, it may be determined that the UE on which allocation is to be performed and the first UE in the UEs on which allocation has already been performed satisfy the orthogonal matching condition. In this way, whether the UE on which allocation is to be performed and any UE in the UEs on which allocation has already been performed satisfy the orthogonal matching condition may be determined. If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the same time-frequency resource to which the time-frequency resource allocated to the UEs on which allocation has already been performed belongs can be allocated to the UE on which allocation is to be performed. If the transmission mode of the UE on which allocation is to be performed is the BF transmission mode, the base station may determine the PCI of the cell to which the UE that is in the UEs on which allocation has already been performed and whose transmission mode is the CRS-based MIMO transmission mode belongs. If the PCI of the cell to which the UE on which allocation is to be performed belongs is different from the PCI of the cell to which the UE that is in the UEs on which allocation has already been performed and whose transmission mode is the CRS-based MIMO transmission mode belongs, the base station may match the beam attribute of the UE on which allocation is to be performed with a beam attribute of any UE (namely, the second UE) in the UEs on which allocation has already been performed. A matching principle may be as follows: If in at least one of the second preset quantity of orthogonal beam groups, neither the beam attribute of the UE on which allocation is to be performed nor the beam attribute of the second UE in the UEs on which allocation has already been performed is the joint attribute, and the beam attribute of the UE on which allocation is to be performed is completely different from the beam attribute of the second UE, it may be determined that the UE on which allocation is to be performed and the second UE in the UEs on which allocation has already been performed satisfy the orthogonal matching condition. In this way, whether the UE on which allocation is to be performed and any UE in the UEs on which allocation has already been performed satisfy the orthogonal matching condition may be determined. If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the same time-frequency resource to which the time-frequency resource allocated to the UEs on which allocation has already been performed belongs can be allocated to the UE on which allocation is to be performed.

In an embodiment, the if that the UE on which allocation is to be performed and the UEs on which allocation has already been performed satisfy an orthogonal matching condition is determined based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, a time-frequency resource in the same time-frequency resource to which the time-frequency resource allocated to the UEs on which allocation has already been performed belongs includes: after that the UE on which allocation is to be performed and the UEs on which allocation has already been performed satisfy the orthogonal matching condition is determined if the transmission modes of the UE on which allocation is to be performed and the UEs on which allocation has already been performed each are a BF transmission mode, and in at least one of the second preset quantity of orthogonal beam groups, neither a beam attribute of the UE on which allocation is to be performed nor a beam attribute of third UE in the UEs on which allocation has already been performed is the joint attribute, and the beam attribute of the UE on which allocation is to be performed is completely different from the beam attribute of the third UE, allocating, to the UE on which allocation is to be performed, the time-frequency resource in the same time-frequency resource to which the time-frequency resource allocated to the UEs on which allocation has already been performed belongs, where the third UE is any UE in the UEs on which allocation has already been performed.

In an embodiment, after determining the transmission modes of the UE on which allocation is to be performed and the UEs on which allocation has already been performed, the base station may determine whether the transmission modes are the same. If the transmission modes of the UE on which allocation is to be performed and the UEs on which allocation has already been performed each are the BF transmission mode, the base station may match the beam attribute of the UE on which allocation is to be performed with a beam attribute of any UE (namely, the third UE) in the UEs on which allocation has already been performed. A matching principle may be as follows: If in one of the second preset quantity of orthogonal beam groups, neither the beam attribute of the UE on which allocation is to be performed nor the beam attribute of the third UE in the UEs on which allocation has already been performed is the joint attribute, and the beam attribute of the UE on which allocation is to be performed is completely different from the beam attribute of the third UE, it may be determined that the UE on which allocation is to be performed and the third UE in the UEs on which allocation has already been performed satisfy the orthogonal matching condition. In this way, whether the UE on which allocation is to be performed and any UE in the UEs on which allocation has already been performed satisfy the orthogonal matching condition may be determined.

If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the same time-frequency resource to which the time-frequency resource allocated to the UEs on which allocation has already been performed belongs can be allocated to the UE on which allocation is to be performed.

In an embodiment, time-frequency resources allocated to the UE on which allocation is to be performed and the UEs on which allocation has already been performed are used for uplink transmission; and the allocating, based on the beam attribute that is of the UE on which allocation is to be performed and that is in the second preset quantity of orthogonal beam groups and a beam attribute that is of one or more UEs on which allocation has already been performed and that is in the second preset quantity of orthogonal beam groups, a time-frequency resource to the UE on which allocation is to be performed includes: if that the UE on which allocation is to be performed and the UEs on which allocation has already been performed satisfy an orthogonal matching condition is determined based on the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, a time-frequency resource in the same time-frequency resource to which the time-frequency resource allocated to the UEs on which allocation has already been performed belongs.

In an embodiment, after the base station determines the beam attribute that is of the UE on which allocation is to be performed and that is in each orthogonal beam group, the base station may determine the UEs on which allocation has already been performed on the same time-frequency resource (where the UEs on which allocation has already been performed and the UE on which allocation is to be performed belong to the same cell or two cells obtained after splitting); then obtain the beam attribute that is of the UEs on which allocation has already been performed and that is in each of the second quantity of orthogonal beam groups; and determine, based on the beam attribute of the UE on which allocation is to be performed and the beam attribute of the UEs on which allocation has already been performed, whether the UE on which allocation is to be performed and the UEs on which allocation has already been performed satisfy the orthogonal matching condition. If the orthogonal matching condition is satisfied, the time-frequency resource in the same time-frequency resource to which the time-frequency resource allocated to the UEs on which allocation has already been performed belongs can be allocated to the UE on which allocation is to be performed.

In an embodiment, the if that the UE on which allocation is to be performed and the UEs on which allocation has already been performed satisfy an orthogonal matching condition is determined based on the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, a time-frequency resource in the same time-frequency resource to which the time-frequency resource allocated to the UEs on which allocation has already been performed belongs includes: obtaining a PCI of a cell to which the UE on which allocation is to be performed belongs and a PCI of a cell to which the UEs on which allocation has already been performed belong; and if that the UE on which allocation is to be performed and the UEs on which allocation has already been performed satisfy the orthogonal matching condition is determined based on the PCI of the cell to which the UE on which allocation is to be performed belongs, the PCI of the cell to which the UEs on which allocation has already been performed belong, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, the time-frequency resource in the same time-frequency resource to which the time-frequency resource allocated to the UEs on which allocation has already been performed belongs.

In an embodiment, when UE accesses an LTE network, the base station records a PCI of a cell to which the UE belongs. Therefore, the base station may obtain, from a storage location for pre-recording PCIs, the PCIs of the cells to which the UE on which allocation is to be performed and the UEs on which allocation has already been performed belong.

After the base station determines the beam attribute that is of the UE on which allocation is to be performed and that is in each orthogonal beam group, the base station may determine the UEs on which allocation has already been performed on the same time-frequency resource (where the UEs on which allocation has already been performed and the UE on which allocation is to be performed belong to the same cell or two cells obtained after splitting), and then obtain the beam attribute that is of the UEs on which allocation has already been performed and that is in each of the second quantity of orthogonal beam groups. Then, the base station may determine, based on the PCI of the cell to which the UE on which allocation is to be performed belongs, the PCI of the cell to which the UEs on which allocation has already been performed belong, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, whether the UE on which allocation is to be performed and the UEs on which allocation has already been performed satisfy the orthogonal matching condition. If the orthogonal matching condition is satisfied, the time-frequency resource in the same time-frequency resource to which the time-frequency resource allocated to the UEs on which allocation has already been performed belongs can be allocated to the UE on which allocation is to be performed.

In an embodiment, the if that the UE on which allocation is to be performed and the UEs on which allocation has already been performed satisfy the orthogonal matching condition is determined based on the PCI of the cell to which the UE on which allocation is to be performed belongs, the PCI of the cell to which the UEs on which allocation has already been performed belong, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocating, to the UE on which allocation is to be performed, the time-frequency resource in the same time-frequency resource to which the time-frequency resource allocated to the UEs on which allocation has already been performed belongs includes: after that the UE on which allocation is to be performed and the UEs on which allocation has already been performed satisfy the orthogonal matching condition is determined if the PCI of the cell to which the UE on which allocation is to be performed belongs is different from a PCI of a cell to which any UE in the UEs on which allocation has already been performed belongs, and in at least one of the second preset quantity of orthogonal beam groups, neither a beam attribute of the UE on which allocation is to be performed nor a beam attribute of fourth UE in the UEs on which allocation has already been performed is the joint attribute, and the beam attribute of the UE on which allocation is to be performed is completely different from the beam attribute of the fourth UE, allocating, to the UE on which allocation is to be performed, the time-frequency resource in the same time-frequency resource to which the time-frequency resource allocated to the UEs on which allocation has already been performed belongs, where the fourth UE is any UE in the UEs on which allocation has already been performed.

In an embodiment, the base station may determine whether the PCI of the cell to which the UE on which allocation is to be performed belongs is the same as the PCI of the cell to which the UEs on which allocation has already been performed belong. If the PCIs are different, the base station may match the beam attribute of the UE on which allocation is to be performed with a beam attribute of any UE (namely, the fourth UE) in the UEs on which allocation has already been performed.

A matching principle may be as follows: If in at least one of the second preset quantity of orthogonal beam groups, neither the beam attribute of the UE on which allocation is to be performed nor the beam attribute of the fourth UE in the UEs on which allocation has already been performed is the joint attribute, and the beam attribute of the UE on which allocation is to be performed is completely different from the beam attribute of the fourth UE, it may be determined that the UE on which allocation is to be performed and the fourth UE in the UEs on which allocation has already been performed satisfy the orthogonal matching condition. In this way, whether the UE on which allocation is to be performed and any UE in the UEs on which allocation has already been performed satisfy the orthogonal matching condition may be determined.

If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the same time-frequency resource to which the time-frequency resource allocated to the UEs on which allocation has already been performed belongs can be allocated to the UE on which allocation is to be performed.

According to a second aspect, a base station is provided. The base station includes a processor, and the processor executes an instruction to implement the time-frequency resource allocation method provided in the first aspect.

According to a third aspect, a time-frequency resource allocation apparatus is provided. The apparatus includes one or more modules, and the one or more modules execute an instruction to implement the time-frequency resource allocation method provided in the first aspect.

According to a fourth aspect, a computer-readable storage medium is provided. The computer-readable storage medium stores an instruction. When the computer-readable storage medium runs on a base station, the base station is enabled to perform the time-frequency resource allocation method provided in the first aspect.

According to a fifth aspect, a computer program product including an instruction is provided. When the computer program product runs on a base station, the base station is enabled to perform the time-frequency resource allocation method provided in the first aspect.

Beneficial effects brought by the technical solutions provided in the embodiments of the present disclosure include at least the following:

In the embodiments of the present disclosure, matching may be performed on the beam attributes of the UEs, to determine whether time-frequency resources in the same time-frequency resource can be allocated to different UEs. Therefore, even if UEs are unevenly distributed in cells obtained after splitting, the time-frequency resource may be flexibly scheduled, so that the time-frequency resource is effectively used.

DESCRIPTION OF EMBODIMENTS

To make objectives, technical solutions, and advantages of this application clearer, the following further describes embodiments of the present disclosure in detail with reference to the accompanying drawings.

To facilitate understanding of embodiments of the present disclosure, the following first describes a system architecture and concepts of terms in the embodiments of the present disclosure.

The embodiments of the present disclosure may be applicable to a long term evolution (LTE) technology. In LTE, more 4G user equipments emerge, and higher requirements are imposed on network coverage and quality. To implement deep network coverage and improve network quality, a soft split technology is used without adding new devices (such as base stations) and with limited time-frequency resources, to improve the network coverage and network capacity. An LTE base station covers three cells, and each cell covers a 120-degree region. After a 120-degree cell is split into two intra-frequency cells by using the soft split technology, service volume distribution affects a capacity expansion effect. For example, resource block (RB) load of the cell before splitting is 90%. There are 10 UEs, and each user may use nine RBs on average. A total of 100 RBs are required. After splitting, there are nine UEs in the left cell and one UE in the right cell. Because there are many RBs for joint scheduling in an overlapping area of the cells obtained after splitting, spectral efficiency of the cell decreases to about 70% to 80% of the original load. In this case, a quantity of RBs required by the nine UEs in the left cell is 9*9/(70%)=115. Even if load of the left cell reaches 100%, a resource is insufficient for the nine UEs. A quantity of RBs required by the one UE in the right cell is 1*9/(70%)=13. A time-frequency resource of the right cell is not effectively used. Therefore, a method for effectively using the time-frequency resource of the right cell needs to be provided.

UE is also referred to as user equipment or a terminal device. The terminal device may also be referred to as an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a station (ST) in a WLAN, or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, or a terminal device in a next-generation communications system.

Figure 1:
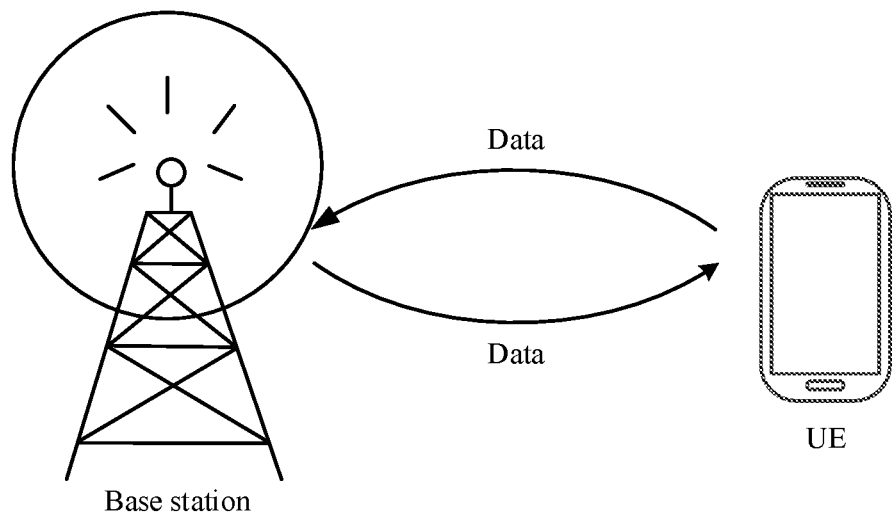
FIG. 1 is a schematic diagram of interaction between a base station and UE according to an embodiment of the present disclosure.

A base station implements wireless communication coverage and provides services for UE through at least one cell, and selectively supports a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) or new radio (NR) system, or the like. As shown in FIG. 1, the base station may communicate with the UE.

An embodiment of the present disclosure provides a time-frequency resource allocation method. The method may be performed by the base station.

Figure 2:
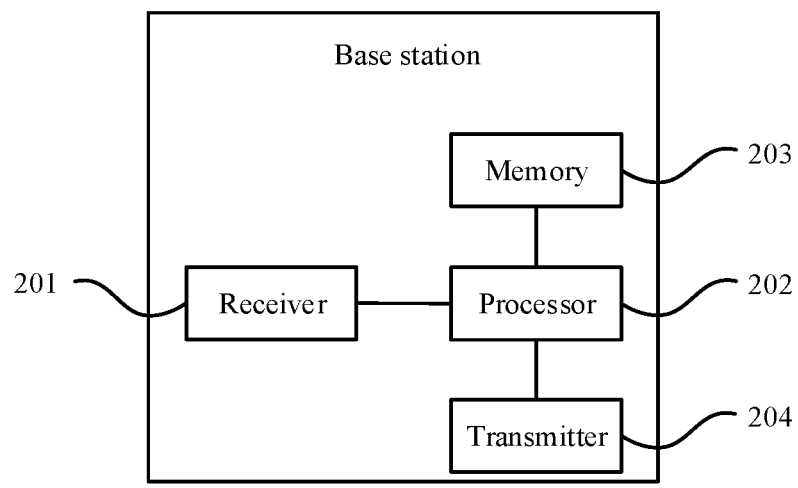
FIG. 2 is a schematic structural diagram of a base station according to an embodiment of the present disclosure.

FIG. 2 is a structural block diagram of a base station according to an embodiment of the present disclosure. The base station may include at least a receiver 201, a processor 202, a memory 203, and a transmitter 204. The receiver 201 may be configured to receive data, and may be specifically configured to receive data from the UE. The transmitter 204 may be configured to send data, and may be specifically configured to send data to UE. The memory 203 may be configured to store a software program and a module. The processor 202 runs the software program and the module stored in the memory 203, to perform various function applications and data processing. The memory 203 mainly includes a program storage area and a data storage area. The program storage area may store an operating system, an application program required by at least one function, and the like; and the data storage area may store data created based on use of the base station, and the like. In addition, the memory 203 may include a high speed random access memory, and may further include a non-volatile memory, for example, at least one magnetic disk storage device, a flash memory device, or another volatile solid-state storage device. Correspondingly, the memory 203 may further include a memory controller, to provide the processor 202, the receiver 201, and the transmitter 204 with access to the memory 203. The processor 202 is a control center of the base station, and connects all parts of the entire base station by using various interfaces and lines. By running or executing the software program and/or the module stored in the memory 203 and invoking the data stored in the memory 203, the processor 202 performs various functions and/or data processing of the base station, to perform overall monitoring on the base station.

In an embodiment, the processor 202 may include one or more processing cores. Preferably, the processor 202 may integrate an application processor and a modem processor. The application processor mainly processes the operating system, a user interface, the application program, and the like, and the modem processor mainly processes wireless communication. It may be understood that the modem processor may alternatively not be integrated in the processor 202.

Figure 3:
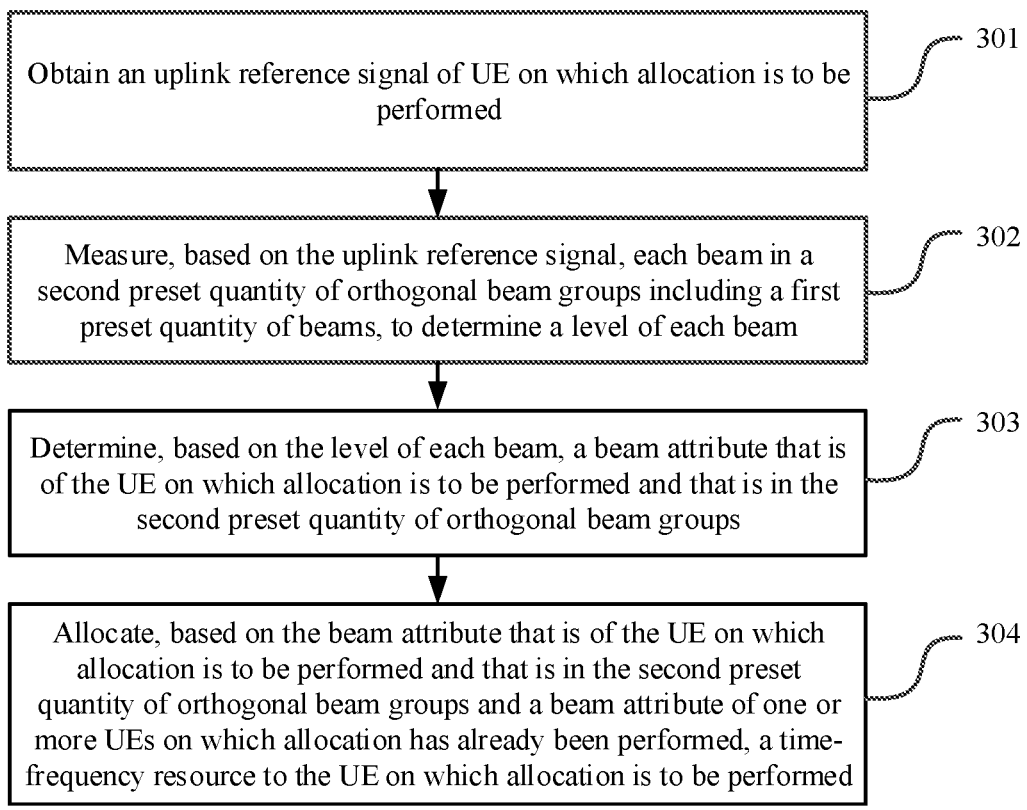
FIG. 3 is a schematic flowchart of time-frequency resource allocation according to an embodiment of the present disclosure.

In an embodiment, the solutions are described by using an example in which the base station sends data to the UE. As shown in FIG. 3, a processing process of the solutions may be as follows:

Operation 301: Obtain an uplink reference signal of UE on which allocation is to be performed.

The UE is UE that is in UEs in two intra-frequency cells obtained after splitting and to which a time-frequency resource used for data transmission has not been allocated currently. The uplink reference signal includes an SRS and/or a DMRS. The SRS is usually periodically transmitted by the UE to the base station, is used by the base station to perform uplink channel estimation, and is usually transmitted in the last symbol of a subframe. The DMRS is usually transmitted only in an RB allocated for transmission of a UE-specific PDSCH.

In an embodiment, when the base station receives data to be sent to the UE (which may be referred to as the UE on which allocation is to be performed below) by a core network side, if the base station has received an SRS sent by the UE on which allocation is to be performed in a current periodicity, the base station may obtain the SRS in the current periodicity; or if the base station does not receive an SRS sent by the UE on which allocation is to be performed in a current periodicity, the base station may obtain an SRS sent by the UE on which allocation is to be performed in a previous periodicity; and/or the base station may obtain a DMRS used when the UE sends data last time.

In an embodiment, when simultaneously receiving data to be sent to a plurality of UEs by the core network side, the base station further first determines UE with a highest priority in the plurality of UEs. Priorities of the UEs are usually determined based on types of the to-be-transmitted data. For example, telephone voice data has a highest priority, and is followed by a short message, video data, and the like with priorities in descending order. The UE with the highest priority is determined as the UE on which allocation is to be performed.

It should be noted that, when the SRS is lost, only the DMRS may be used; when the DMRS is lost, only the SRS may be used; and when both the SRS and the DMRS exist, both the SRS and the DMRS may be used.

Operation 302: Measure, based on the uplink reference signal, each beam in a second preset quantity of orthogonal beam groups including a first preset quantity of beams, to determine a level of each beam.

The orthogonal beam group means that a plurality of included beams do not interfere with each other, or interference between a plurality of beams is less than a specific threshold and does not affect normal data sending and receiving. The first preset quantity of beams may be configured by a skilled person based on a status of an antenna of the base station. The first preset quantity of beams may form the second preset quantity of orthogonal beam groups through adjustment of a weighting coefficient, an amplitude, and the like of the antenna of the base station. For example, there are M beams in total. Each time the weighting coefficient and the amplitude of the antenna of the base station are adjusted, M other beams may be generated based on the M beams, and the M generated beams are orthogonal to the M beams. N orthogonal beam groups are obtained through N−1 times of adjustment, and the second preset quantity is N. The level refers to an equivalent power of the beam.

In an embodiment, after obtaining the uplink reference signal of the UE on which allocation is to be performed, the base station may obtain the second preset quantity of orthogonal beam groups including the first preset quantity of beams, and then separately measure any beam in each orthogonal beam group by using the uplink reference signal, to obtain a level of any beam.

In an embodiment, an equivalent channel response of each beam may be first determined, and the level of each beam is determined based on the equivalent channel response. Corresponding processing in operation 302 may be as follows:

Measure, based on the uplink reference signal of the UE, each beam in the second preset quantity of orthogonal beam groups including the first preset quantity of beams, to determine the equivalent channel response of each beam; and determine the level of each beam based on the equivalent channel response of each beam.

In an embodiment, it is assumed that the base station has P sending/receiving physical channels, each orthogonal beam group includes M beams, and the M beams can complement each other in terms of coverage. An equivalent channel response of each beam in any orthogonal beam group in the second preset quantity of orthogonal beam groups may be calculated in the following manner:

$$\begin{bmatrix} \overline{H}^0 \\ \vdots \\ \overline{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix} \quad (1)$$

In formula (1), $$\begin{bmatrix} H_0 \\ \vdots \\ H_{P-1} \end{bmatrix}$$

indicates received channel coefficients of the P physical channels, that is, the SRS, of the UE on which allocation is to be performed, that is obtained from the last symbol of a subframe. $H_0$ indicates a channel coefficient of the first physical channel, and so on.

$$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

indicates weights of a plurality of beams (the weights of the plurality of beams are preset and stored in the base station), and is different for each orthogonal beam group. $[w_0^m \ldots w_{P-1}^m]$ is a weight vector of a beam m on a used physical channel, where m belongs to [0, M−1].

$$\begin{bmatrix} \overline{H}^0 \\ \vdots \\ \overline{H}^{M-1} \end{bmatrix}$$

indicates the equivalent channel response, of each beam, obtained after weighted processing.

In this way, the equivalent channel response of each beam in each of the second preset quantity of orthogonal beam groups may be calculated in the foregoing manner.

Then, the base station may calculate an equivalent power of each beam according to the following formula:

$$\begin{bmatrix} P^0 \\ \vdots \\ P^{M-1} \end{bmatrix} = 10 * \log 10 \left( \begin{bmatrix} \|\overline{H}^0\| \\ \vdots \\ \|\overline{H}^{M-1}\| \end{bmatrix} \right) - E \quad (2)$$

In formula (2), $\|\overline{H}^m\|$ indicates a norm of an equivalent channel coefficient of the beam m, where m belongs to [0, M−1]. $\|\overline{H}^m\| = \Sigma |h|^2$, where E indicates an uplink physical channel gain and is a preset value.

After determining the equivalent power of each beam, the base station may determine the equivalent power of each beam as the level of each beam.

It should be noted that an example in which the uplink reference signal is the SRS is used for description herein. If the uplink reference signal is the DMRS, $$\begin{bmatrix} H_0 \\ \vdots \\ H_{P-1} \end{bmatrix}$$

may be replaced with the obtained DMRS. If the uplink reference signal is the SRS and the DMRS, and if the SRS is obtained on a physical channel, a channel coefficient of the physical channel is the SRS; if the DMRS is obtained on a physical channel, a channel coefficient of the physical channel is the DMRS; or if the SRS and the DMRS are obtained on a physical channel, a channel coefficient of the physical channel may be either the SRS or the DMRS.

Operation 303: Determine, based on the level of each beam, a beam attribute that is of the UE on which allocation is to be performed and that is in the second preset quantity of orthogonal beam groups.

The beam attribute is used to measure a beam approximating to a UE characteristic, to be specific, is used to represent a distribution characteristic of the UE on a beam group, and is a comprehensive channel representation of an azimuth (AOA), an antenna correlation, and the like.

In an embodiment, after determining the level of each beam in each orthogonal beam group, the base station may determine a beam attribute that is of the UE on which allocation is to be performed and that is in each orthogonal beam group based on the level of each beam.

In an embodiment, the beam attribute of the UE on which allocation is to be performed may be determined through comparison. Corresponding processing in operation 303 may be as follows:

For each orthogonal beam group, if a target beam satisfying a preset condition exists in the orthogonal beam group, determine that a beam attribute that is of the UE on which allocation is to be performed and that is in the orthogonal beam group is the target beam; or if no beam satisfying a preset condition exists in the orthogonal beam group, determine that a beam attribute that is of the UE on which allocation is to be performed and that is in the orthogonal beam group is a joint attribute.

The preset condition may be preset and stored in the base station. The preset condition is that a difference between a level of the target beam and a level of any other beam than the target beam in the orthogonal beam group is greater than a preset value. There are one or more target beams. The preset value may be preset and stored in the base station, and is used to measure a correlation between beams.

In an embodiment, the base station may compare levels of beams in any orthogonal beam group. If the difference between the level of the target beam in the orthogonal beam group and the level of any other beam than the target beam in the orthogonal beam group is greater than the preset value, the base station determines that the beam attribute that is of the UE on which allocation is to be performed and that is in the orthogonal beam group is the target beam.

For example, in an orthogonal beam group, if a difference between a level of a beam x (the target beam) with a highest level and a level of any other beam is greater than the preset value, a beam attribute of the UE on which allocation is to be performed is the beam x; or if a difference between a level of each of a plurality of beams x and y with higher levels and a level of any other beam is greater than the preset value, it is determined that beam attributes of the UE on which allocation is to be performed are the beam x and the beam y. If no beam satisfying the preset condition exists in the orthogonal beam group, it may be determined that the beam attribute that is of the UE on which allocation is to be performed and that is in the orthogonal beam group is the joint attribute.

In this way, by analogy, the beam attribute that is of the UE on which allocation is to be performed and that is in each orthogonal beam group may be determined in the same manner.

Operation 304: Allocate, based on the beam attribute that is of the UE on which allocation is to be performed and that is in the second preset quantity of orthogonal beam groups and a beam attribute of one or more UEs on which allocation has already been performed, a time-frequency resource to the UE on which allocation is to be performed.

The UEs on which allocation has already been performed use a same time-frequency resource, and some resources in the same time-frequency resource are not occupied (for example, the same time-frequency resource is a same RBG, and some resources are some RBs). There are one or more UEs on which allocation has already been performed, and the time-frequency resource allocated to the UEs on which allocation has already been performed is used by the base station to send data to the UEs. The same time-frequency resource refers to a same RBG or a same RB. The RBG may include a plurality of RBs, and a quantity of the RBs may be configured based on a service. An example in which the same time-frequency resource is the same RBG is used for description in the following description process of this embodiment of the present disclosure.

In an embodiment, after the base station determines the beam attribute that is of the UE on which allocation is to be performed and that is in each orthogonal beam group, if an RB that is not occupied exists in the RBG used for current time-frequency resource allocation, the base station may obtain the UEs on which allocation has already been performed on the RBG (where the UEs on which allocation has already been performed and the UE on which allocation is to be performed belong to a same cell or two cells obtained after splitting), and then obtain a beam attribute that is of the UEs on which allocation has already been performed and that is in each of the second preset quantity of beam groups (where a determining method is the same as the foregoing method for determining the beam attribute of the UE on which allocation is to be performed, and details are not described herein again). Then, the base station allocates, based on the beam attribute of the UE on which allocation is to be performed and the beam attribute of the UEs on which allocation has already been performed, the time-frequency resource to the UE on which allocation is to be performed.

In addition, if a time-frequency resource in a new time-frequency resource (an RB or an RBG) currently starts to be allocated to the UE on which allocation is to be performed, because no time-frequency resource in the new time-frequency resource is allocated to another UE, the time-frequency resource in the new time-frequency resource may be directly allocated to the UE on which allocation is to be performed. For example, if a time-frequency resource in a new RBG currently starts to be allocated to the UE on which allocation is to be performed, because no time-frequency resource in the new RBG is allocated to another UE, the time-frequency resource in the RBG may be directly allocated to the UE on which allocation is to be performed.

In an embodiment, the time-frequency resource may be further allocated to the UE on which allocation is to be performed based on a transmission mode and the beam attribute of the UE on which allocation is to be performed. Corresponding processing in operation 304 may be as follows:

Determine the transmission mode of the UE on which allocation is to be performed and a transmission mode of the UEs on which allocation has already been performed; and allocate, based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, the time-frequency resource to the UE on which allocation is to be performed.

When the base station transmits downlink data to the UE, transmission modes usually include a multiple-input multiple-output MIMO transmission mode, a BF transmission mode, a transmit diversity transmission mode, and the like. In this embodiment of the present disclosure, the mentioned transmission mode is a downlink transmission mode, and is usually the CRS-based MIMO transmission mode or the BF transmission mode.

In an embodiment, the base station may determine the transmission mode of the UE based on a reference signal used for demodulation. If demodulation is performed based on a CRS, the base station determines that the UE uses the CRS-based MIMO transmission mode; or if demodulation is performed based on the DMRS of the UE, the base station determines that the UE uses the BF transmission mode. The base station may determine the transmission modes of the UE on which allocation is to be performed and the UEs on which allocation has already been performed according to this principle, and then allocate, based on the transmission mode of the UE on which allocation is to be performed, the transmission mode of the UEs on which allocation has already been performed, and the beam attributes that are of the UE on which allocation is to be performed and the UEs on which allocation has already been performed and that are in the second preset quantity of orthogonal beam groups, the time-frequency resource to the UE on which allocation is to be performed.

It should be noted that, the CRS is transmitted in each downlink subframe and each RB in frequency domain, may be used by the UE for channel estimation and coherent demodulation of all downlink transmissions, and may further be used by the UE to obtain channel-state information (CSI). The DMRS is a UE-specific reference signal used by the UE for channel estimation and coherent demodulation. The DMRS is usually transmitted only in the RB allocated for transmission of the UE-specific PDSCH.

In an embodiment, whether the UE on which allocation is to be performed and the UEs on which allocation has already been performed satisfy an orthogonal matching condition may be first determined, and the time-frequency resource is allocated to the UE on which allocation is to be performed based on the result. Corresponding processing may be as follows:

If that the UE on which allocation is to be performed and the UEs on which allocation has already been performed satisfy the orthogonal matching condition is determined based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocate, to the UE on which allocation is to be performed, a time-frequency resource in the same time-frequency resource to which the time-frequency resource allocated to the UEs on which allocation has already been performed belongs.

The orthogonal matching condition is a condition satisfied by two UEs that do not interfere with each other when downlink data is transmitted on the same RBG.

Figure 4:
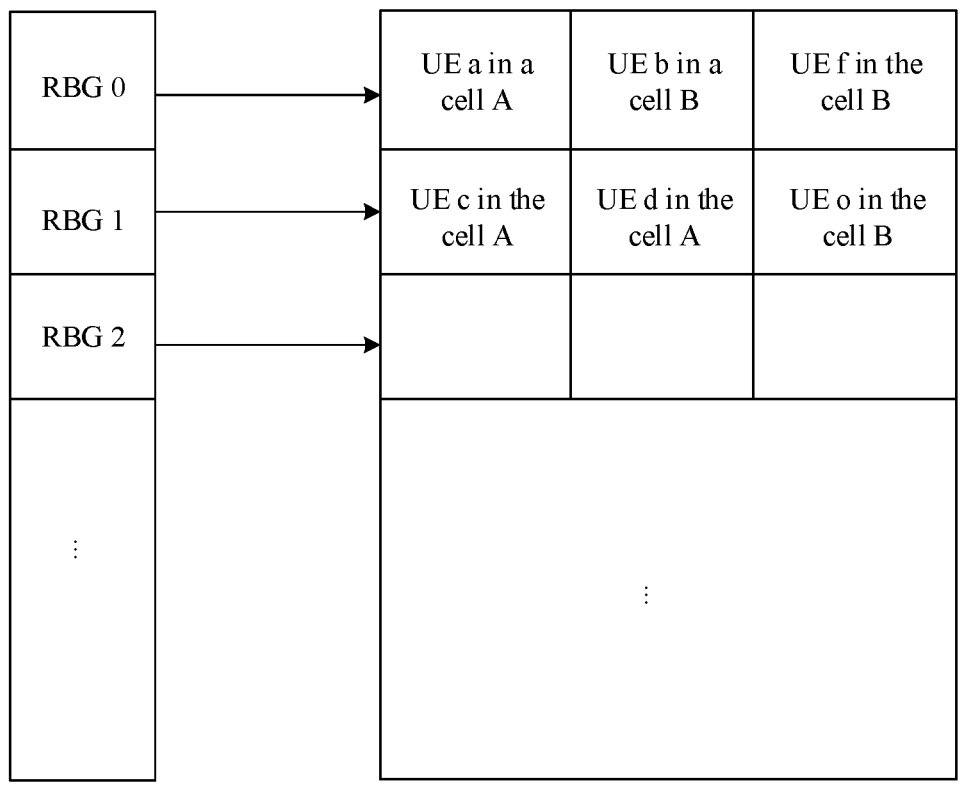
FIG. 4 is a schematic diagram of time-frequency resource allocation on RBGs according to an embodiment of the present disclosure.

In an embodiment, the base station may determine, based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, whether the UE on which allocation is to be performed and the UEs on which allocation has already been performed satisfy the orthogonal matching condition. If the UE on which allocation is to be performed and the UEs on which allocation has already been performed satisfy the orthogonal matching condition, it indicates that a correlation between the UE on which allocation is to be performed and any UE in the UEs on which allocation has already been performed is relatively low, and the UE on which allocation is to be performed and any UE in the UEs on which allocation has already been performed do not affect each other. In this way, the time-frequency resource in the RBG to which the time-frequency resource allocated to the UEs on which allocation has already been performed belongs can be allocated to the UE on which allocation is to be performed. For example, as shown in FIG. 4, on an RBG 1, the UE on which allocation is to be performed is UE o in a cell B. Because the UE o satisfies the orthogonal matching condition with UE d and UE c, the UE o, the UE d, and the UE c may use the same RBG 1. A Cell A and the cell B are two cells obtained after splitting.

In addition, if the UE on which allocation is to be performed and the UEs on which allocation has already been performed do not satisfy the orthogonal matching condition (the UE on which allocation is to be performed and one of the UEs on which allocation has already been performed do not satisfy the orthogonal matching condition), it indicates that a correlation between the UE on which allocation is to be performed and the UE in the UEs on which allocation has already been performed is relatively high, and the UE on which allocation is to be performed and the UE in the UEs on which allocation has already been performed may affect each other in data receiving and demodulation. Consequently, the time-frequency resource in the RBG to which the time-frequency resource allocated to the UEs on which allocation has already been performed belongs cannot be allocated to the UE on which allocation is to be performed.

In addition, when the UE on which allocation is to be performed and the UEs on which allocation has already been performed do not satisfy the orthogonal matching condition, the base station may determine priorities of other UEs waiting for time-frequency resource allocation, determine UE with a highest priority from the UEs, and allocate a time-frequency resource to the UE in the foregoing manner. After all time-frequency resources in the current RBG are allocated, the base station may first allocate a time-frequency resource in a next RBG to the UE on which allocation is to be performed.

It should be noted that, when there is a plurality of UEs on which allocation has already been performed, that the UE on which allocation is to be performed and the UEs on which allocation has already been performed satisfy the orthogonal matching condition may be determined only when the UE on which allocation is to be performed and each of the UEs on which allocation has already been performed satisfy the orthogonal matching condition. As long as one of the UEs on which allocation has already been performed and the UE on which allocation is to be performed do not satisfy the orthogonal matching condition, the UE on which allocation is to be performed and the UEs on which allocation has already been performed do not satisfy the orthogonal matching condition.

In an embodiment, when the transmission mode of the UE on which allocation is to be performed is the CRS-based MIMO transmission mode, and there is UE that is in the UEs on which allocation has already been performed and that uses the same transmission mode as the UE on which allocation is to be performed, whether the orthogonal matching condition is satisfied may be determined in the following manner. Corresponding processing may be as follows:

If at least one UE using the CRS-based MIMO transmission mode exists in the UE on which allocation is to be performed and the UEs on which allocation has already been performed, obtain a physical cell identifier PCI of a cell to which the UE on which allocation is to be performed belongs and a PCI of a cell to which the UEs on which allocation has already been performed belong; and if that the UE on which allocation is to be performed and the UEs on which allocation has already been performed satisfy the orthogonal matching condition is determined based on the beam attribute that is of the UE on which allocation is to be performed and that is in the second preset quantity of orthogonal beam groups, the beam attribute that is of the UEs on which allocation has already been performed and that is in the second preset quantity of orthogonal beam groups, the PCI of the cell to which the UE on which allocation is to be performed belongs, and the PCI of the cell to which the UEs on which allocation has already been performed belong, allocate, to the UE on which allocation is to be performed, the time-frequency resource in the same time-frequency resource to which the time-frequency resource allocated to the UEs on which allocation has already been performed belongs.

In an embodiment, when UE accesses an LTE network, the base station records a physical cell identifier of a cell to which the UE belongs. Therefore, the base station may obtain, from a storage location for pre-recording PCIs, the PCIs of the cells to which the UE on which allocation is to be performed and the UEs on which allocation has already been performed belong.

After determining the transmission modes of the UE on which allocation is to be performed and the UEs on which allocation has already been performed, the base station may determine whether at least one UE using the CRS-based MIMO transmission mode exists in the UE on which allocation is to be performed and the UEs on which allocation has already been performed; if yes, obtain the PCI of the cell to which the UE on which allocation is to be performed belongs, and the PCI of the cell to which the UEs on which allocation has already been performed belong; and then determine, based on the obtained PCIs, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, whether the UE on which allocation is to be performed and the UEs on which allocation has already been performed satisfy the orthogonal matching condition. If the orthogonal matching condition is satisfied, the time-frequency resource in the same time-frequency resource to which the time-frequency resource allocated to the UEs on which allocation has already been performed belongs can be allocated to the UE on which allocation is to be performed.

In an embodiment, whether the orthogonal matching condition is satisfied may be determined based on the PCIs in the following manner. Corresponding processing may be as follows:

After that the UE on which allocation is to be performed and the UEs on which allocation has already been performed satisfy the orthogonal matching condition is determined if the transmission mode of the UE on which allocation is to be performed is the CRS-based MIMO transmission mode, the PCI of the cell to which the UE on which allocation is to be performed belongs is different from a PCI of a cell to which UE that is in the UEs on which allocation has already been performed and whose transmission mode is the CRS-based MIMO transmission mode belongs, the PCI of the cell to which the UE on which allocation is to be performed belongs is different from a PCI of a cell to which UE that is in the UEs on which allocation has already been performed and whose transmission mode is the BF transmission mode belongs, and in at least one of the second preset quantity of orthogonal beam groups, neither a beam attribute of the UE on which allocation is to be performed nor a beam attribute of first UE in the UEs on which allocation has already been performed is the joint attribute, and the beam attribute of the UE on which allocation is to be performed is completely different from the beam attribute of the first UE, allocate, to the UE on which allocation is to be performed, the time-frequency resource in the same time-frequency resource to which the time-frequency resource allocated to the UEs on which allocation has already been performed belongs, where the first UE is any UE in the UEs on which allocation has already been performed; or after that the UE on which allocation is to be performed and the UEs on which allocation has already been performed satisfy the orthogonal matching condition is determined if the transmission mode of the UE on which allocation is to be performed is the BF transmission mode, the PCI of the cell to which the UE on which allocation is to be performed belongs is different from a PCI of a cell to which UE that is in the UEs on which allocation has already been performed and whose transmission mode is the CRS-based MIMO transmission mode belongs, and in at least one of the second preset quantity of orthogonal beam groups, neither a beam attribute of the UE on which allocation is to be performed nor a beam attribute of second UE in the UEs on which allocation has already been performed is the joint attribute, and the beam attribute of the UE on which allocation is to be performed is completely different from the beam attribute of the UE on which allocation has already been performed, allocate, to the UE on which allocation is to be performed, the time-frequency resource in the same time-frequency resource to which the time-frequency resource allocated to the UEs on which allocation has already been performed belongs, where the second UE is any UE in the UEs on which allocation has already been performed.

In an embodiment, if the transmission mode of the UE on which allocation is to be performed is the CRS-based MIMO transmission mode, the base station may determine the PCI of the cell to which the UE that is in the UEs on which allocation has already been performed and whose transmission mode is the CRS-based MIMO transmission mode belongs. If the PCI of the cell to which the UE on which allocation is to be performed belongs is different from the PCI of the cell to which the UE that is in the UEs on which allocation has already been performed and whose transmission mode is the CRS-based MIMO transmission mode belongs, the base station may determine the PCI of the cell to which the UE that is in the UEs on which allocation has already been performed and whose transmission mode is the BF transmission mode belongs. If determining that the PCI of the cell to which the UE on which allocation is to be performed belongs is different from the PCI of the cell to which the UE that is in the UEs on which allocation has already been performed and whose transmission mode is the BF transmission mode belongs (in other words, the transmission mode of the UE on which allocation is to be performed is the CRS-based MIMO transmission mode, and no UE whose PCI is the same as the PCI of the cell to which the UE on which allocation is to be performed belongs exists in the UEs on which allocation has already been performed), the base station may match the beam attribute of the UE on which allocation is to be performed with a beam attribute of any UE (namely, the first UE) in the UEs on which allocation has already been performed. A matching principle may be as follows:

If in at least one of the second preset quantity of orthogonal beam groups, neither the beam attribute of the UE on which allocation is to be performed nor the beam attribute of the first UE in the UEs on which allocation has already been performed is the joint attribute, and the beam attribute of the UE on which allocation is to be performed is completely different from the beam attribute of the first UE, it may be determined that the UE on which allocation is to be performed and the first UE in the UEs on which allocation has already been performed satisfy the orthogonal matching condition. In this way, whether the UE on which allocation is to be performed and any UE in the UEs on which allocation has already been performed satisfy the orthogonal matching condition may be determined.

If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the RBG to which the time-frequency resource allocated to the UEs on which allocation has already been performed belongs can be allocated to the UE on which allocation is to be performed.

Figure 5:
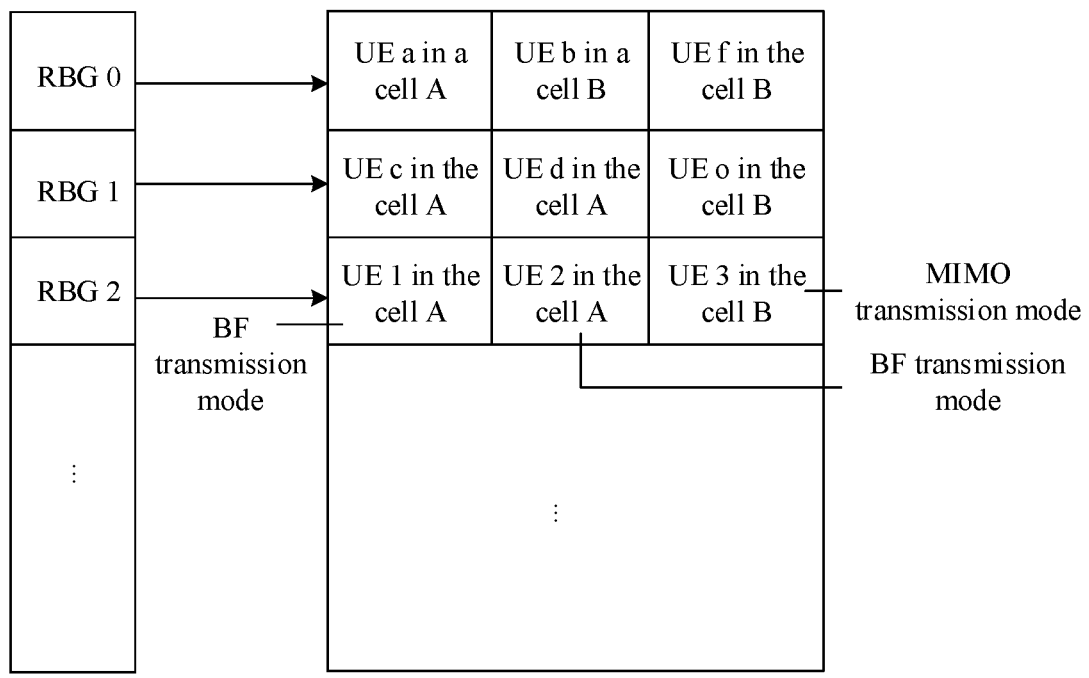
FIG. 5 is a schematic diagram of time-frequency resource allocation on RBGs according to an embodiment of the present disclosure.

For example, as shown in FIG. 5, on an RBG 2, two UEs on which allocation has already been performed are UE 1 and UE 2, and the UE on which allocation is to be performed is UE 3. A transmission mode of the UE 1 is the BF transmission mode, and a PCI of a cell to which the UE 1 belongs is a cell A. A transmission mode of the UE 2 is the BF transmission mode, and a PCI of a cell to which the UE 2 belongs is the cell A. A transmission mode of the UE 3 is the CRS-based MIMO transmission mode, and a PCI of a cell to which the UE 3 belongs is a cell B. The transmission mode of the UE 3 is different from that of the UE 1 and that of the UE 2, the PCI of the cell to which the UE 1 belongs is different from that of the cell to which the UE 3 belongs, and the PCI of the cell to which the UE 2 belongs is different from that of the cell to which the UE 3 belongs. Then, in a first orthogonal beam group in the second preset quantity of orthogonal beam groups (where the first orthogonal beam group is any beam group in the second preset quantity of orthogonal beam groups), neither a beam attribute of the UE 1 nor a beam attribute of the UE 3 is the joint attribute; the beam attribute of the UE 1 is a beam x, and the beam attribute of the UE 3 is a beam y, which are completely different from each other; and a beam attribute of the UE 2 is a beam z, which is also completely different from that of the UE 3. It may be determined that the UE 3 separately satisfies the orthogonal matching condition with the UE 1 and the UE 2. In this way, a time-frequency resource in the RBG 2 to which time-frequency resources allocated to the UE 1 and the UE 2 belong can be allocated to the UE 3.

If the transmission mode of the UE on which allocation is to be performed is the BF transmission mode, the base station may determine the PCI of the cell to which the UE that is in the UEs on which allocation has already been performed and whose transmission mode is the CRS-based MIMO transmission mode belongs. If the PCI of the cell to which the UE on which allocation is to be performed belongs is different from the PCI of the cell to which the UE that is in the UEs on which allocation has already been performed and whose transmission mode is the CRS-based MIMO transmission mode belongs, the base station may match the beam attribute of the UE on which allocation is to be performed with a beam attribute of any UE (namely, the second UE) in the UEs on which allocation has already been performed. A matching principle may be as follows:

If in at least one of the second preset quantity of orthogonal beam groups, neither the beam attribute of the UE on which allocation is to be performed nor the beam attribute of the second UE in the UEs on which allocation has already been performed is the joint attribute, and the beam attribute of the UE on which allocation is to be performed is completely different from the beam attribute of the second UE, it may be determined that the UE on which allocation is to be performed and the second UE in the UEs on which allocation has already been performed satisfy the orthogonal matching condition. In this way, whether the UE on which allocation is to be performed and any UE in the UEs on which allocation has already been performed satisfy the orthogonal matching condition may be determined.

If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the RBG to which the time-frequency resource allocated to the UEs on which allocation has already been performed belongs can be allocated to the UE on which allocation is to be performed.

For example, on an RBG 3, the UE on which allocation has already been performed is UE 3, and the UE on which allocation is to be performed is UE 4. A transmission mode of the UE 3 is the CRS-based MIMO transmission mode, and a PCI of a cell to which the UE 3 belongs is a cell A. A transmission mode of the UE 4 is the BF transmission mode, and a PCI of a cell to which the UE 4 belongs is a cell B. The PCI of the cell to which the UE 3 belongs is different from that of the cell to which the UE 4 belongs Then, in a first orthogonal beam group in the second preset quantity of orthogonal beam groups (where the first orthogonal beam group is any beam group in the second preset quantity of orthogonal beam groups), neither a beam attribute of the UE 3 nor a beam attribute of the UE 4 is the joint attribute; and the beam attribute of the UE 3 is a beam x, and the beam attribute of the UE 4 is a beam y, which are completely different from each other. It may be determined that the UE 4 and the UE 3 satisfy the orthogonal matching condition. In this way, a time-frequency resource in the RBG to which a time-frequency resource allocated to the UE 3 belongs can be allocated to the UE 4.

In addition, if the transmission mode of the UE on which allocation is to be performed is the CRS-based MIMO transmission mode, and the PCI of the cell to which the UE on which allocation is to be performed belongs is the same as a PCI of a cell to which any UE that is in the UEs on which allocation has already been performed and whose transmission mode is the CRS-based MIMO transmission mode belongs, the UE on which allocation is to be performed and the UEs on which allocation has already been performed do not satisfy the orthogonal matching condition. Consequently, the time-frequency resource in the RBG to which the time-frequency resource allocated to the UEs on which allocation has already been performed belongs cannot be allocated to the UE on which allocation is to be performed.

In addition, if the transmission mode of the UE on which allocation is to be performed is the CRS-based MIMO transmission mode, and the PCI of the cell to which the UE on which allocation is to be performed belongs is the same as a PCI of a cell to which any UE that is in the UEs on which allocation has already been performed and whose transmission mode is the BF transmission mode belongs, the UE on which allocation is to be performed and the UEs on which allocation has already been performed do not satisfy the orthogonal matching condition.

In addition, if the transmission mode of the UE on which allocation is to be performed is the BF transmission mode, and the PCI of the cell to which the UE on which allocation is to be performed belongs is the same as a PCI of a cell to which any UE that is in the UEs on which allocation has already been performed and whose transmission mode is the CRS-based MIMO transmission mode belongs, the UE on which allocation is to be performed and the UEs on which allocation has already been performed do not satisfy the orthogonal matching condition.

In addition, if the transmission mode of the UE on which allocation is to be performed is the CRS-based MIMO transmission mode, the PCI of the cell to which the UE on which allocation is to be performed belongs is different from the PCI of the cell to which the UE that is in the UEs on which allocation has already been performed and whose transmission mode is the CRS-based MIMO transmission mode belongs, and the PCI of the cell to which the UE on which allocation is to be performed belongs is different from the PCI of the cell to which the UE that is in the UEs on which allocation has already been performed and whose transmission mode is the BF transmission mode belongs, but in none of the second preset quantity of orthogonal beam groups, either the beam attribute of the UE on which allocation is to be performed or a beam attribute of at least one of the UEs on which allocation has already been performed is the joint attribute, or the beam attribute of the UE on which allocation is to be performed and a beam attribute of at least one of the UEs on which allocation has already been performed each are the joint attribute, but the beam attributes are not completely different, it may be determined that the UE on which allocation is to be performed and the UE in the UEs on which allocation has already been performed do not satisfy the orthogonal matching condition. In this case, the UE on which allocation is to be performed and the UEs on which allocation has already been performed do not satisfy the orthogonal matching condition.

In addition, if the transmission mode of the UE on which allocation is to be performed is the BF transmission mode, the PCI of the cell to which the UE on which allocation is to be performed belongs is different from the PCI of the cell to which the UE that is in the UEs on which allocation has already been performed and whose transmission mode is the CRS-based MIMO transmission mode belongs, and the PCI of the cell to which the UE on which allocation is to be performed belongs is different from the PCI of the cell to which the UE that is in the UEs on which allocation has already been performed and whose transmission mode is the BF transmission mode belongs, but in none of the second preset quantity of orthogonal beam groups, either the beam attribute of the UE on which allocation is to be performed or a beam attribute of at least one of the UEs on which allocation has already been performed is the joint attribute, or the beam attribute of the UE on which allocation is to be performed and a beam attribute of at least one of the UEs on which allocation has already been performed each are the joint attribute, but the beam attributes are not completely different, it may be determined that the UE on which allocation is to be performed and the UE in the UEs on which allocation has already been performed do not satisfy the orthogonal matching condition. In this case, the UE on which allocation is to be performed and the UEs on which allocation has already been performed do not satisfy the orthogonal matching condition.

In an embodiment, when the UE on which allocation is to be performed and the UEs on which allocation has already been performed do not satisfy the orthogonal matching condition, the base station may determine priorities of other UEs waiting for time-frequency resource allocation, determine UE with a highest priority from the UEs, and allocate a time-frequency resource to the UE in the foregoing manner. After all time-frequency resources in the current RBG are allocated, the base station may first allocate a time-frequency resource in a next RBG to the UE on which allocation is to be performed.

In an embodiment, when the transmission modes of the UE on which allocation is to be performed and the UEs on which allocation has already been performed each are the BF transmission mode, whether the orthogonal matching condition is satisfied may be determined in the following manner. Corresponding processing may be as follows:

After that the UE on which allocation is to be performed and the UEs on which allocation has already been performed satisfy the orthogonal matching condition is determined if the transmission modes of the UE on which allocation is to be performed and the UEs on which allocation has already been performed each are the BF transmission mode, and in at least one of the second preset quantity of orthogonal beam groups, neither a beam attribute of the UE on which allocation is to be performed nor a beam attribute of third UE in the UEs on which allocation has already been performed is the joint attribute, and the beam attribute of the UE on which allocation is to be performed is completely different from the beam attribute of the third UE, allocate, to the UE on which allocation is to be performed, the time-frequency resource in the RBG to which the time-frequency resource allocated to the UEs on which allocation has already been performed belongs, where the third UE is any UE in the UEs on which allocation has already been performed.

In an embodiment, after determining the transmission modes of the UE on which allocation is to be performed and the UEs on which allocation has already been performed, the base station may determine whether the transmission modes are the same. If the transmission modes of the UE on which allocation is to be performed and the UEs on which allocation has already been performed each are the BF transmission mode, the base station may match the beam attribute of the UE on which allocation is to be performed with a beam attribute of any UE (namely, the third UE) in the UEs on which allocation has already been performed. A matching principle may be as follows:

If in one of the second preset quantity of orthogonal beam groups, neither the beam attribute of the UE on which allocation is to be performed nor the beam attribute of the third UE in the UEs on which allocation has already been performed is the joint attribute, and the beam attribute of the UE on which allocation is to be performed is completely different from the beam attribute of the third UE, it may be determined that the UE on which allocation is to be performed and the third UE in the UEs on which allocation has already been performed satisfy the orthogonal matching condition. In this way, whether the UE on which allocation is to be performed and any UE in the UEs on which allocation has already been performed satisfy the orthogonal matching condition may be determined.

If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the RBG to which the time-frequency resource allocated to the UEs on which allocation has already been performed belongs can be allocated to the UE on which allocation is to be performed.

For example, two UEs on which allocation has already been performed are UE 5 and UE 6, and the UE on which allocation is to be performed is UE 7. Transmission modes of the UE 5 and the UE 6 each are the BF transmission mode, and a transmission mode of the UE 7 is the BF transmission mode. In a second orthogonal beam group in the second preset quantity of orthogonal beam groups, a beam attribute of the UE 5 is a beam x, and a beam attribute of the UE 7 is a beam p. It may be determined that in the second orthogonal beam group, neither the beam attribute of the UE 5 nor the beam attribute of the UE 7 is the joint attribute, and the beam attribute of the UE 5 is completely different from the beam attribute of the UE 7, so that it may be determined that the UE 5 and the UE7 satisfy the orthogonal matching condition. In addition, in a third orthogonal beam group in the second preset quantity of orthogonal beam groups, a beam attribute of the UE 6 is a beam z, and a beam attribute of the UE 7 is a beam p. It may be determined that in the third orthogonal beam group, neither the beam attribute of the UE 6 nor the beam attribute of the UE 7 is the joint attribute, and the beam attribute of the UE 6 is completely different from the beam attribute of the UE 7, so that it may be determined that the UE 6 and the UE 7 satisfy the orthogonal matching condition. In this way, it may be determined that the UE on which allocation is to be performed and the UEs on which allocation has already been performed satisfy the orthogonal matching condition, and a time-frequency resource in the RBG to which time-frequency resources allocated to the UE 5 and the UE 6 belong can be allocated to the UE 7.

In addition, if the transmission modes of the UE on which allocation is to be performed and the UEs on which allocation has already been performed each are the BF transmission mode, and in none of the second preset quantity of orthogonal beam groups, either the beam attribute of the UE on which allocation is to be performed or a beam attribute of at least one of the UEs on which allocation has already been performed is the joint attribute, or the beam attribute of the UE on which allocation is to be performed and a beam attribute of at least one of the UEs on which allocation has already been performed each are the joint attribute, but the beam attributes are not completely different, it may be determined that the UE on which allocation is to be performed and the UE in the UEs on which allocation has already been performed do not satisfy the orthogonal matching condition. In this case, the UE on which allocation is to be performed and the UEs on which allocation has already been performed do not satisfy the orthogonal matching condition.

In an embodiment, when the UE on which allocation is to be performed and the UEs on which allocation has already been performed do not satisfy the orthogonal matching condition, the base station may determine priorities of other UEs waiting for time-frequency resource allocation, determine UE with a highest priority from the UEs, and allocate a time-frequency resource to the UE in the foregoing manner. After all time-frequency resources in the current RBG are allocated, the base station may first allocate a time-frequency resource in a next RBG to the UE on which allocation is to be performed.

After allocating the time-frequency resource to the UE on which allocation is to be performed, the base station may map data to be transmitted to the UE on which allocation is to be performed onto the time-frequency resource allocated to the UE on which allocation is to be performed, and send the data to the UE on which allocation is to be performed by using the time-frequency resource.

In addition, in this embodiment of the present disclosure, after the time-frequency resource in the same time-frequency resource is allocated to the UE on which allocation is to be performed, a beam weight of the UEs on which allocation has already been performed may be further obtained, a channel coefficient of the UE on which allocation is to be performed is obtained, a matrix is formed by using the beam weight of the UEs on which allocation has already been performed and the channel coefficient of the UE on which allocation is to be performed, and then the matrix is used to perform orthogonalization processing on the channel coefficient of the UE on which allocation is to be performed and the beam weight of the UEs on which allocation has already been performed, to obtain an orthogonal weight. The data of the UE on which allocation is to be performed is mapped onto the time-frequency resource allocated to the UE on which allocation is to be performed based on the orthogonal weight.

For example, a beam weight of UE a in the UEs on which allocation has already been performed is $$W_a = \begin{bmatrix} w_0^0 \\ \vdots \\ w_{P-1}^0 \end{bmatrix},$$

the channel coefficient of the UE on which allocation is to be performed is $$H_b = \begin{bmatrix} H_0 \\ \vdots \\ H_{P-1} \end{bmatrix},$$

the formed matrix is $C=[\text{conj}(W_a), H_b]$, and the weight obtained after orthogonalization processing $D=((C^H*C)^{-1}*C^H)^H$ is performed on the beam weight of the UE a and the channel coefficient of the UE on which allocation is to be performed is $\vec{W_a}=D(:,1)$. The data of the UE on which allocation is to be performed is mapped, based on the weight, onto the time-frequency resource allocated to the UE on which allocation is to be performed.

Similarly, when data of any UE in the UEs on which allocation has already been performed is mapped onto a time-frequency resource allocated to the UE, a matrix is also formed by using a channel coefficient of the UE and a beam weight of the UE on which allocation is to be performed, and then the matrix is used to perform orthogonalization processing on the channel coefficient of the UE and the beam weight of the UE on which allocation is to be performed, to obtain an orthogonal weight. The data of the UE is mapped, based on the orthogonal weight, onto the time-frequency resource allocated to the UE. In this way, because orthogonalization processing is performed, the UE on which allocation is to be performed and the UEs on which allocation has already been performed can more accurately demodulate data sent to the UE on which allocation is to be performed and the UEs on which allocation has already been performed.

In an embodiment, matching may be performed on the beam attributes of the UEs, to determine whether time-frequency resources in the same time-frequency resource can be allocated to different UEs. Therefore, even if UEs are unevenly distributed in cells obtained after splitting, the time-frequency resource may be flexibly scheduled, so that the time-frequency resource is effectively used.

Figure 6:
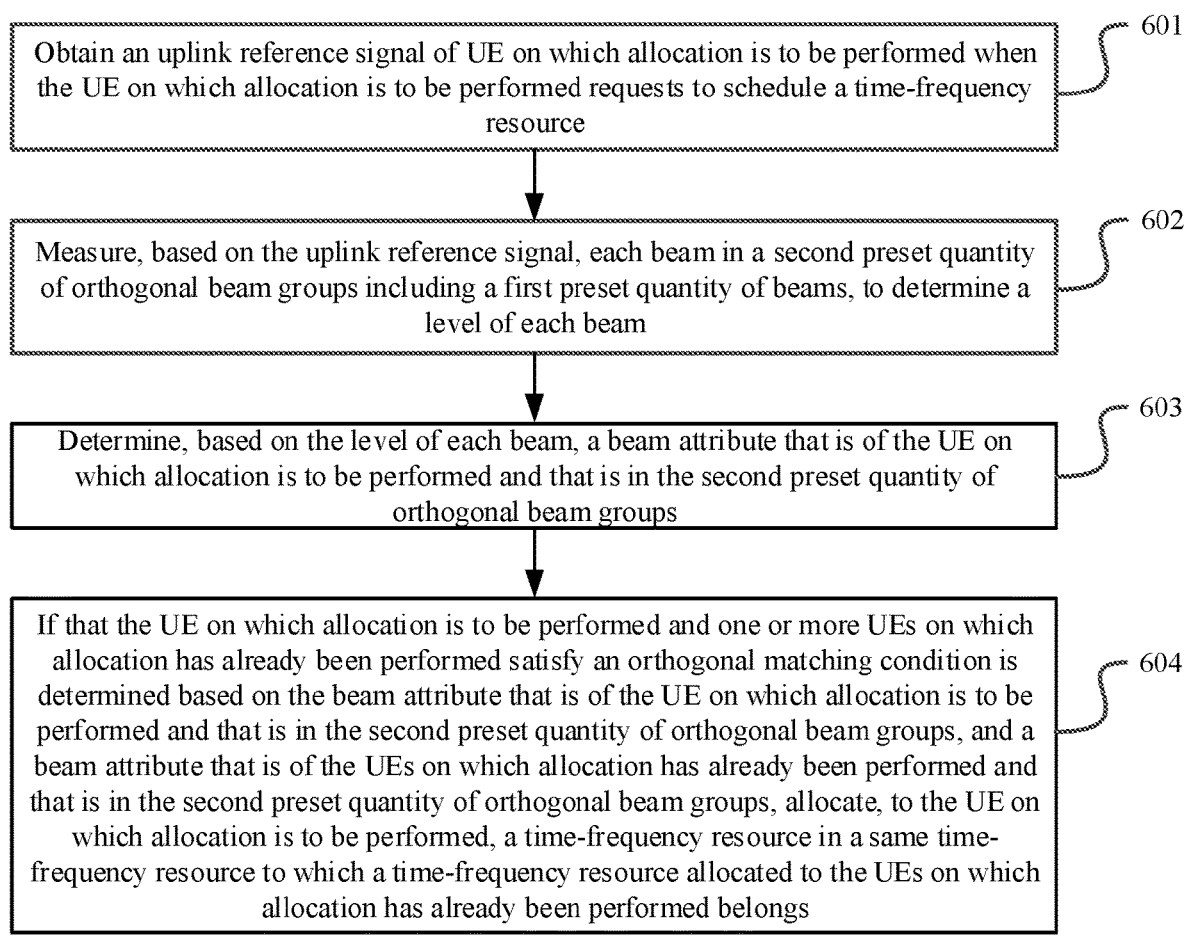
FIG. 6 is a schematic flowchart of time-frequency resource allocation according to an embodiment of the present disclosure.

In an embodiment, the solutions are described by using an example in which UE requests to schedule a time-frequency resource when sending data to a base station. As shown in FIG. 6, a processing process of the solutions may be as follows:

Operation 601: Obtain an uplink reference signal of UE on which allocation is to be performed when the UE on which allocation is to be performed requests to schedule a time-frequency resource.

Time-frequency resources allocated to the UE on which allocation is to be performed and one or more UEs on which allocation has already been performed are used for uplink data transmission. The time-frequency resource allocated by the base station to the UE on which allocation is to be performed is used by the UE on which allocation is to be performed to transmit data to the base station.

In an embodiment, when sending data to the outside through a network, the UE (which may be referred to as the UE on which allocation is to be performed below) requests the base station to allocate the time-frequency resource to the UE. The UE sends a resource scheduling request to the base station. When the base station receives the time-frequency resource scheduling request sent by the UE, if the base station has received an SRS sent by the UE on which allocation is to be performed in a current periodicity, the base station may obtain the SRS in the current periodicity; or if the base station does not receive an SRS sent by the UE on which allocation is to be performed in a current periodicity, the base station may obtain an SRS sent by the UE on which allocation is to be performed in a previous periodicity; and/or the base station may obtain a DMRS used when the UE sends data last time.

In an embodiment, when simultaneously receiving resource scheduling requests sent by a plurality of UEs, the base station further first determines UE with a highest priority in the plurality of UEs. Priorities of the UEs are usually determined based on types of the to-be-transmitted data. For example, telephone voice data has a highest priority, and is followed by a short message, video data, and the like with priorities in descending order. The UE with the highest priority is determined as the UE on which allocation is to be performed.

Operation 602: Measure, based on the uplink reference signal, each beam in a second preset quantity of orthogonal beam groups including a first preset quantity of beams, to determine a level of each beam.

The orthogonal beam group means that a plurality of included beams do not interfere with each other, or interference between a plurality of beams is less than a specific threshold and does not affect normal data sending and receiving. The first preset quantity of beams may be configured by a skilled person based on a status of an antenna of the base station. The first preset quantity of beams may form the second preset quantity of orthogonal beam groups through adjustment of a weighting coefficient, an amplitude, and the like of the antenna of the base station. For example, there are M beams in total. Each time the weighting coefficient and the amplitude of the antenna of the base station are adjusted, M other beams may be generated based on the M beams, and the M generated beams are orthogonal to the M beams. N orthogonal beam groups are obtained through N−1 times of adjustment, and the second preset quantity is N. The level refers to an equivalent power of the beam.

In an embodiment, after obtaining the uplink reference signal of the UE on which allocation is to be performed, the base station may obtain the second preset quantity of orthogonal beam groups including the first preset quantity of beams, and then separately measure any beam in each orthogonal beam group by using the uplink reference signal, to obtain a level of any beam.

In an embodiment, an equivalent channel response of each beam may be first determined, and the level of each beam is determined based on the equivalent channel response. Corresponding processing in operation 602 may be as follows:

Measure, based on the uplink reference signal, each beam in the second preset quantity of orthogonal beam groups including the first preset quantity of beams, to determine the equivalent channel response of each beam; and determine the level of each beam based on the equivalent channel response of each beam.

In an embodiment, this process is the same as the manner of determining the level of the beam in the foregoing embodiment. For this process, refer to the foregoing descriptions. Details are not described herein again.

Operation 603: Determine, based on the level of each beam, a beam attribute that is of the UE on which allocation is to be performed and that is in the second preset quantity of orthogonal beam groups.

The beam attribute is used to measure a beam approximating the UE, and subsequently, a correlation between the UEs may be measured based on the beam attribute.

In an embodiment, after determining the level of each beam in each orthogonal beam group, the base station may determine a beam attribute that is of the UE on which allocation is to be performed and that is in each orthogonal beam group based on the level of each beam.

In an embodiment, the beam attribute of the UE on which allocation is to be performed may be determined through comparison. Corresponding processing in operation 303 may be as follows:

For each orthogonal beam group, if a target beam satisfying a preset condition exists in the orthogonal beam group, determine that a beam attribute that is of the UE on which allocation is to be performed and that is in the orthogonal beam group is the target beam; or if no beam satisfying a preset condition exists in the orthogonal beam group, determine that a beam attribute that is of the UE on which allocation is to be performed and that is in the orthogonal beam group is a joint attribute.

The preset condition may be preset and stored in the base station. The preset condition is that a difference between a level of the target beam and a level of any other beam than the target beam in the orthogonal beam group is greater than a preset value. There are one or more target beams. The preset value may be preset and stored in the base station, and is used to measure a correlation between beams.

In an embodiment, the base station may compare levels of beams in any orthogonal beam group. If the difference between the level of the target beam in the orthogonal beam group and the level of any other beam than the target beam in the orthogonal beam group is greater than the preset value, the base station determines that the beam attribute that is of the UE on which allocation is to be performed and that is in the orthogonal beam group is the target beam.

For example, in an orthogonal beam group, if a difference between a level of a beam x (the target beam) with a highest level and a level of any other beam is greater than the preset value, a beam attribute of the UE on which allocation is to be performed is the beam x; or if a difference between a level of each of a plurality of beams x and y with higher levels and a level of any other beam is greater than the preset value, it is determined that beam attributes of the UE on which allocation is to be performed are the beam x and the beam y. If no beam satisfying the preset condition exists in the orthogonal beam group, it may be determined that the beam attribute that is of the UE on which allocation is to be performed and that is in the orthogonal beam group is the joint attribute.

In this way, by analogy, the beam attribute that is of the UE on which allocation is to be performed and that is in each orthogonal beam group may be determined in the same manner.

Operation 604: If that the UE on which allocation is to be performed and the UEs on which allocation has already been performed satisfy an orthogonal matching condition is determined based on the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocate, to the UE on which allocation is to be performed, a time-frequency resource in a same time-frequency resource to which the time-frequency resource allocated to the UEs on which allocation has already been performed belongs.

The UEs on which allocation has already been performed use the same time-frequency resource, and some resources in the same time-frequency resource are not occupied (for example, the same time-frequency resource is a same RBG, and some resources are some RBs). There are one or more UEs on which allocation has already been performed, and the time-frequency resource allocated to the UEs on which allocation has already been performed is used by the UEs to send data to the base station. The same time-frequency resource refers to a same resource block group or a same time-frequency resource block RB. The RBG may include a plurality of RBs, and a quantity of the RBs may be configured based on a service. An example in which the same time-frequency resource is the same RBG is used for description in the following description process of this embodiment of the present disclosure.

In an embodiment, after the base station determines the beam attribute that is of the UE on which allocation is to be performed and that is in each orthogonal beam group, if an RB that is not occupied exists in the RBG used for current time-frequency resource allocation, the base station may determine the UEs on which allocation has already been performed on the RBG (where the UEs on which allocation has already been performed and the UE on which allocation is to be performed belong to a same cell or two cells obtained after splitting), then obtain the beam attribute that is of the UEs on which allocation has already been performed and that is in each of the second quantity of orthogonal beam groups, and determine, based on the beam attribute of the UE on which allocation is to be performed and the beam attribute of the UEs on which allocation has already been performed, whether the UE on which allocation is to be performed and the UEs on which allocation has already been performed satisfy the orthogonal matching condition. If the orthogonal matching condition is satisfied, the time-frequency resource in the RBG to which the time-frequency resource allocated to the UEs on which allocation has already been performed belongs can be allocated to the UE on which allocation is to be performed.

In addition, if a time-frequency resource in a new RBG currently starts to be allocated to the UE, the time-frequency resource in the RBG is directly allocated to the UE on which allocation is to be performed.

In addition, if the UE on which allocation is to be performed and the UEs on which allocation has already been performed do not satisfy the orthogonal matching condition (the UE on which allocation is to be performed and any UE in the UEs on which allocation has already been performed do not satisfy the orthogonal matching condition), it indicates that a correlation between the UE on which allocation is to be performed and the UE on which allocation has already been performed is relatively high, and the UE on which allocation is to be performed and the UE on which allocation has already been performed may affect each other in data receiving and demodulation. Consequently, the time-frequency resource in the RBG to which the time-frequency resource allocated to the UEs on which allocation has already been performed belongs cannot be allocated to the UE on which allocation is to be performed.

In addition, when the UE on which allocation is to be performed and the UEs on which allocation has already been performed do not satisfy the orthogonal matching condition, the base station may determine priorities of other UEs waiting for time-frequency resource allocation, determine UE with a highest priority from the UEs, and allocate a time-frequency resource to the UE in the foregoing manner. After all time-frequency resources in the current RBG are allocated, the base station may first allocate a time-frequency resource in a next RBG to the UE on which allocation is to be performed.

In an embodiment, whether the UE on which allocation is to be performed and the UEs on which allocation has already been performed satisfy the orthogonal matching condition may be determined based on cell identifiers of cells to which the UE on which allocation is to be performed and the UEs on which allocation has already been performed belong. Corresponding processing may be as follows:

Obtain a PCI of the cell to which the UE on which allocation is to be performed belongs and a PCI of the cell to which the UEs on which allocation has already been performed belong; and if that the UE on which allocation is to be performed and the UEs on which allocation has already been performed satisfy the orthogonal matching condition is determined based on the PCI of the cell to which the UE on which allocation is to be performed belongs, the PCI of the cell to which the UEs on which allocation has already been performed belong, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocate, to the UE on which allocation is to be performed, the time-frequency resource in the RBG to which the time-frequency resource allocated to the UEs on which allocation has already been performed belongs.

In an embodiment, when UE accesses an LTE network, the base station records a PCI of a cell to which the UE belongs. Therefore, the base station may obtain, from a storage location for pre-recording PCIs, the PCIs of the cells to which the UE on which allocation is to be performed and the UEs on which allocation has already been performed belong.

After the base station determines the beam attribute that is of the UE on which allocation is to be performed and that is in each orthogonal beam group, if an RB that is not occupied exists in the RBG that is used for current time-frequency resource allocation, the base station may determine the UEs on which allocation has already been performed on the RBG (where the UEs on which allocation has already been performed and the UE on which allocation is to be performed belong to a same cell or two cells obtained after splitting); and then obtain a beam attribute that is of the UEs on which allocation has already been performed and that is in each of the second quantity of orthogonal beam groups. Then, the base station may determine, based on the PCI of the cell to which the UE on which allocation is to be performed belongs, the PCI of the cell to which the UEs on which allocation has already been performed belong, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, whether the UE on which allocation is to be performed and the UEs on which allocation has already been performed satisfy the orthogonal matching condition. If the orthogonal matching condition is satisfied, the time-frequency resource in the RBG to which the time-frequency resource allocated to the UEs on which allocation has already been performed belongs can be allocated to the UE on which allocation is to be performed.

In an embodiment, whether the UE on which allocation is to be performed and the UEs on which allocation has already been performed satisfy the orthogonal matching condition may be determined based on the cell identifiers of the cells to which the UE on which allocation is to be performed and the UEs on which allocation has already been performed belong. Corresponding processing may be as follows:

After that the UE on which allocation is to be performed and the UEs on which allocation has already been performed satisfy the orthogonal matching condition is determined if the PCI of the cell to which the UE on which allocation is to be performed belongs is different from a PCI of a cell to which any UE in the UEs on which allocation has already been performed belongs, and in at least one of the second preset quantity of orthogonal beam groups, neither a beam attribute of the UE on which allocation is to be performed nor a beam attribute of fourth UE in the UEs on which allocation has already been performed is the joint attribute, and the beam attribute of the UE on which allocation is to be performed is completely different from the beam attribute of the fourth UE, allocate, to the UE on which allocation is to be performed, the time-frequency resource in the RBG to which the time-frequency resource allocated to the UEs on which allocation has already been performed belongs, where the fourth UE is any UE in the UEs on which allocation has already been performed.

In an embodiment, the base station may determine whether the PCI of the cell to which the UE on which allocation is to be performed belongs is the same as the PCI of the cell to which the UEs on which allocation has already been performed belong. If the PCIs are different, the base station may match the beam attribute of the UE on which allocation is to be performed with a beam attribute of any UE (namely, the fourth UE) in the UEs on which allocation has already been performed.

A matching principle may be as follows: If in at least one of the second preset quantity of orthogonal beam groups, neither the beam attribute of the UE on which allocation is to be performed nor the beam attribute of the fourth UE in the UEs on which allocation has already been performed is the joint attribute, and the beam attribute of the UE on which allocation is to be performed is completely different from the beam attribute of the fourth UE, it may be determined that the UE on which allocation is to be performed and the fourth UE in the UEs on which allocation has already been performed satisfy the orthogonal matching condition. In this way, whether the UE on which allocation is to be performed and any UE in the UEs on which allocation has already been performed satisfy the orthogonal matching condition may be determined.

If the UE on which allocation is to be performed and any UE in the UEs on which allocation has already been performed satisfy the orthogonal matching condition, it is determined that the UE on which allocation is to be performed and the UEs on which allocation has already been performed satisfy the orthogonal matching condition. In this way, the time-frequency resource in the RBG to which the time-frequency resource allocated to the UEs on which allocation has already been performed belongs can be allocated to the UE on which allocation is to be performed.

In addition, if the PCI of the cell to which the UE on which allocation is to be performed belongs is the same as the PCI of the cell to which any UE in the UEs on which allocation has already been performed belongs, the UE on which allocation is to be performed and the UEs on which allocation has already been performed do not satisfy the orthogonal matching condition. Consequently, the time-frequency resource in the RBG to which the time-frequency resource allocated to the UEs on which allocation has already been performed belongs cannot be allocated to the UE on which allocation is to be performed. In an embodiment, the base station may determine priorities of other UEs waiting for time-frequency resource allocation, determine UE with a highest priority from the UEs, and allocate a time-frequency resource to the UE in the foregoing manner. After all time-frequency resources in the current RBG are allocated, the base station may first allocate a time-frequency resource in a next RBG to the UE on which allocation is to be performed.

After allocating the time-frequency resource to the UE on which allocation is to be performed, the base station may notify the UE of the time-frequency resource allocated to the UE on which allocation is to be performed, and the UE may send the data to the base station on the time-frequency resource.

Figure 7:
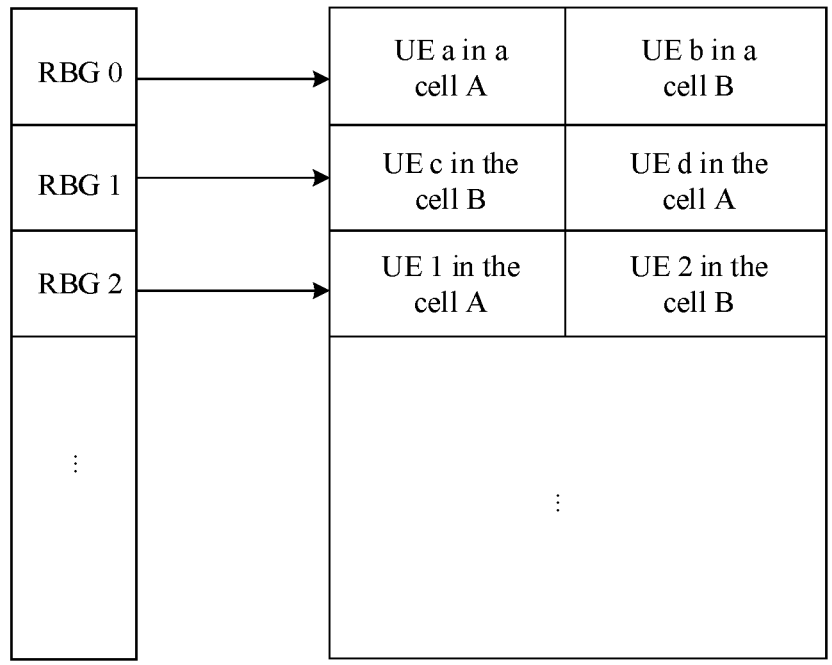
FIG. 7 is a schematic diagram of time-frequency resource allocation on RBGs according to an embodiment of the present disclosure.

It should be noted that, during uplink scheduling of the time-frequency resource, because two intra-frequency cells are obtained after splitting, and the PCI of the cell to which the UE on which allocation is to be performed belongs is limited to be different from the PCI of the cell to which the UEs on which allocation has already been performed belong, time-frequency resources in one RBG can be scheduled only for two UEs, and the two UEs belong to different cells. For example, as shown in FIG. 7, on an RGB 0, there is only UE a in a cell A and UE b in a cell B.

It should be noted that, in the current technology, when uplink data of a plurality of UEs is transmitted on a same RBG, quantities of REs occupied by the plurality of UEs need to be completely the same. However, in the embodiments of the present disclosure, as long as the orthogonal matching condition is satisfied, it indicates that a correlation between the UEs is relatively small, and mutual impact is relatively small. The quantities of occupied resource elements (RE) are irrelevant. Therefore, the quantities of occupied REs do not need to be completely the same.

It should be noted that, in the foregoing two embodiments of this application, an example in which one cell is split into two cells through soft splitting is used for description. In a subsequent use process, any other quantity of cells obtained through soft splitting may be applied to the foregoing two embodiments of this application.

In an embodiment, matching may be performed on the beam attributes of the UEs, to determine whether time-frequency resources in the same time-frequency resource can be allocated to different UEs. Therefore, even if UEs are unevenly distributed in cells obtained after splitting, the time-frequency resource may be flexibly scheduled, so that the time-frequency resource is effectively used.

Figure 8:
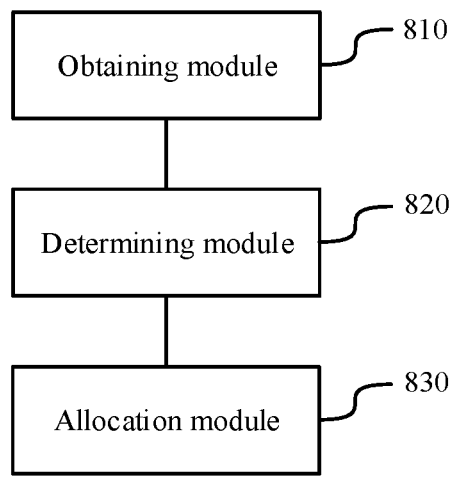
FIG. 8 is a schematic structural diagram of a time-frequency resource allocation apparatus according to an embodiment of the present disclosure.

Based on a same technical concept, an embodiment of the present disclosure further provides a time-frequency resource allocation apparatus. As shown in FIG. 8, the apparatus includes:

An obtaining module 810 is configured to obtain an uplink reference signal of user equipment UE on which allocation is to be performed, where the uplink reference signal includes an uplink channel sounding reference signal SRS and/or a specific reference signal DMRS; and may specifically implement the obtaining function in operation 301 and operation 601, and other implicit operations.

A determining module 820 is configured to: measure, based on the uplink reference signal, each beam in a second preset quantity of orthogonal beam groups including a first preset quantity of beams, to determine a level of each beam; and determine, based on the level of each beam, a beam attribute that is of the UE on which allocation is to be performed and that is in the second preset quantity of orthogonal beam groups; and may specifically implement the determining function in operation 302, operation 303, operation 602, and operation 603, and other implicit operations.

An allocation module 830 is configured to allocate, based on the beam attribute that is of the UE on which allocation is to be performed and that is in the second preset quantity of orthogonal beam groups and a beam attribute that is of one or more UEs on which allocation has already been performed and that is in the second preset quantity of orthogonal beam groups, a time-frequency resource to the UE on which allocation is to be performed, where the UEs on which allocation has already been performed use a same time-frequency resource, and the same time-frequency resource is a same time-frequency resource block RB or a same time-frequency resource block group RBG; and may specifically implement the allocation function in operation 304 and operation 604, and other implicit operations.

In an embodiment, the determining module 820 is configured to:

measure, based on the SRS, each beam in the second preset quantity of orthogonal beam groups including the first preset quantity of beams, to determine an equivalent channel response of each beam; and determine the level of each beam based on the equivalent channel response of each beam.

In an embodiment, the determining module 820 is configured to:

for each orthogonal beam group, if a target beam satisfying a preset condition exists in the orthogonal beam group, determine that a beam attribute that is of the UE on which allocation is to be performed and that is in the orthogonal beam group is the target beam; or if no beam satisfying a preset condition exists in the orthogonal beam group, determine that a beam attribute that is of the UE on which allocation is to be performed and that is in the orthogonal beam group is a joint attribute, where the preset condition is that a difference between a level of the target beam and a level of any other beam than the target beam in the orthogonal beam group is greater than or equal to a preset value.

In an embodiment, time-frequency resources allocated to the UE on which allocation is to be performed and the UEs on which allocation has already been performed are used for downlink transmission; and the allocation module 830 is configured to:

determine a transmission mode of the UE on which allocation is to be performed and a transmission mode of the UEs on which allocation has already been performed; and allocate, based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, the time-frequency resource to the UE on which allocation is to be performed.

In an embodiment, the allocation module 830 is configured to:

if that the UE on which allocation is to be performed and the UEs on which allocation has already been performed satisfy an orthogonal matching condition is determined based on the transmission mode of the UE on which allocation is to be performed, the transmission mode of the UEs on which allocation has already been performed, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocate, to the UE on which allocation is to be performed, a time-frequency resource in the time-frequency resource to which the time-frequency resource allocated to the UEs on which allocation has already been performed belongs.

In an embodiment, the allocation module 830 is configured to:

if at least one UE using a multiple-input multiple-output MIMO transmission mode exists in the UE on which allocation is to be performed and the UEs on which allocation has already been performed, obtain a physical cell identifier PCI of a cell to which the UE on which allocation is to be performed belongs and a PCI of a cell to which the UEs on which allocation has already been performed belong; and if that the UE on which allocation is to be performed and the UEs on which allocation has already been performed satisfy the orthogonal matching condition is determined based on the beam attribute that is of the UE on which allocation is to be performed and that is in the second preset quantity of orthogonal beam groups, the beam attribute that is of the UEs on which allocation has already been performed and that is in the second preset quantity of orthogonal beam groups, the PCI of the cell to which the UE on which allocation is to be performed belongs, and the PCI of the cell to which the UEs on which allocation has already been performed belong, allocate, to the UE on which allocation is to be performed, the time-frequency resource in the time-frequency resource to which the time-frequency resource allocated to the UEs on which allocation has already been performed belongs.

In an embodiment, the allocation module 830 is configured to:

after that the UE on which allocation is to be performed and the UEs on which allocation has already been performed satisfy the orthogonal matching condition is determined if the transmission mode of the UE on which allocation is to be performed is the MIMO transmission mode, the PCI of the cell to which the UE on which allocation is to be performed belongs is different from a PCI of a cell to which UE that is in the UEs on which allocation has already been performed and whose transmission mode is the MIMO transmission mode belongs, the PCI of the cell to which the UE on which allocation is to be performed belongs is different from a PCI of a cell to which UE that is in the UEs on which allocation has already been performed and whose transmission mode is a BF transmission mode belongs, and in at least one of the second preset quantity of orthogonal beam groups, neither a beam attribute of the UE on which allocation is to be performed nor a beam attribute of first UE in the UEs on which allocation has already been performed is the joint attribute, and the beam attribute of the UE on which allocation is to be performed is completely different from the beam attribute of the first UE, allocate, to the UE on which allocation is to be performed, the time-frequency resource in the time-frequency resource to which the time-frequency resource allocated to the UEs on which allocation has already been performed belongs, where the first UE is any UE in the UEs on which allocation has already been performed; or after that the UE on which allocation is to be performed and the UEs on which allocation has already been performed satisfy the orthogonal matching condition is determined if the transmission mode of the UE on which allocation is to be performed is a BF transmission mode, the PCI of the cell to which the UE on which allocation is to be performed belongs is different from a PCI of a cell to which UE that is in the UEs on which allocation has already been performed and whose transmission mode is the MIMO transmission mode belongs, and in at least one of the second preset quantity of orthogonal beam groups, neither a beam attribute of the UE on which allocation is to be performed nor a beam attribute of second UE in the UEs on which allocation has already been performed is the joint attribute, and the beam attribute of the UE on which allocation is to be performed is completely different from the beam attribute of the UEs on which allocation has already been performed, allocate, to the UE on which allocation is to be performed, the time-frequency resource in the time-frequency resource to which the time-frequency resource allocated to the UEs on which allocation has already been performed belongs, where the second UE is any UE in the UEs on which allocation has already been performed.

In an embodiment, the allocation module 830 is configured to:

after that the UE on which allocation is to be performed and the UEs on which allocation has already been performed satisfy the orthogonal matching condition is determined if the transmission modes of the UE on which allocation is to be performed and the UEs on which allocation has already been performed each are a BF transmission mode, and in at least one of the second preset quantity of orthogonal beam groups, neither a beam attribute of the UE on which allocation is to be performed nor a beam attribute of third UE in the UEs on which allocation has already been performed is the joint attribute, and the beam attribute of the UE on which allocation is to be performed is completely different from the beam attribute of the third UE, allocate, to the UE on which allocation is to be performed, the time-frequency resource in the time-frequency resource to which the time-frequency resource allocated to the UEs on which allocation has already been performed belongs, where the third UE is any UE in the UEs on which allocation has already been performed.

In an embodiment, time-frequency resources allocated to the UE on which allocation is to be performed and the UEs on which allocation has already been performed are used for uplink transmission; and the allocation module 830 is configured to:

if that the UE on which allocation is to be performed and the UEs on which allocation has already been performed satisfy an orthogonal matching condition is determined based on the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocate, to the UE on which allocation is to be performed, a time-frequency resource in the time-frequency resource to which the time-frequency resource allocated to the UEs on which allocation has already been performed belongs.

In an embodiment, the allocation module 830 is configured to:

obtain a PCI of a cell to which the UE on which allocation is to be performed belongs and a PCI of a cell to which the UEs on which allocation has already been performed belong; and if that the UE on which allocation is to be performed and the UEs on which allocation has already been performed satisfy the orthogonal matching condition is determined based on the PCI of the cell to which the UE on which allocation is to be performed belongs, the PCI of the cell to which the UEs on which allocation has already been performed belong, the beam attribute that is of the UE on which allocation is to be performed and that is in the second preset quantity of orthogonal beam groups, and the beam attribute that is of the UEs on which allocation has already been performed and that is in the second preset quantity of orthogonal beam groups, allocate, to the UE on which allocation is to be performed, the time-frequency resource in the time-frequency resource to which the time-frequency resource allocated to the UEs on which allocation has already been performed belongs.

In an embodiment, the allocation module 830 is configured to:

after that the UE on which allocation is to be performed and the UEs on which allocation has already been performed satisfy the orthogonal matching condition is determined if the PCI of the cell to which the UE on which allocation is to be performed belongs is different from a PCI of a cell to which any UE in the UEs on which allocation has already been performed belongs, and in at least one of the second preset quantity of orthogonal beam groups, neither a beam attribute of the UE on which allocation is to be performed nor a beam attribute of fourth UE in the UEs on which allocation has already been performed is the joint attribute, and the beam attribute of the UE on which allocation is to be performed is completely different from the beam attribute of the fourth UE, allocate, to the UE on which allocation is to be performed, the time-frequency resource in the time-frequency resource to which the time-frequency resource allocated to the UEs on which allocation has already been performed belongs, where the fourth UE is any UE in the UEs on which allocation has already been performed.

In an embodiment, matching may be performed on the beam attributes of the UEs, to determine whether time-frequency resources in the same time-frequency resource can be allocated to different UEs. Therefore, even if UEs are unevenly distributed in cells obtained after splitting, the time-frequency resource may be flexibly scheduled, so that the time-frequency resource is effectively used.

It should be noted that when the time-frequency resource allocation apparatus provided in the foregoing embodiment allocates the time-frequency resource, division into the foregoing function modules is merely used as an example for description. In an embodiment, the foregoing functions may be allocated to different function modules and implemented according to a requirement, that is, an inner structure of the apparatus is divided into different function modules to implement all or a part of the functions described above. In addition, the time-frequency resource allocation apparatus provided in the foregoing embodiment pertains to a same concept as the time-frequency resource allocation method embodiments.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on an apparatus, all or some of the procedures or functions according to the embodiments of the present disclosure are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by an apparatus, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The foregoing descriptions are merely embodiments of this application, but are not intended to limit this application. Any modification, equivalent replacement, or improvement made without departing from the spirit and principle of this application should fall within the protection scope of this application.

What is claimed is:

1. A time-frequency resource allocation method comprising:
   obtaining an uplink reference signal of a first user equipment (UE) on which allocation is to be performed, the uplink reference signal comprising an uplink channel sounding reference signal (SRS) and/or a demodulation reference signal (DMRS);
   measuring, based on the uplink reference signal, each beam in a preset quantity of orthogonal beam groups comprising a first preset quantity of beams, to determine a level of each beam;
   determining, based on the level of each beam, a first beam attribute of the first UE in the preset quantity of orthogonal beam groups; and
   allocating, based on the first beam attribute of the first UE and a second beam attribute of a second UE on which allocation has already been performed in the preset quantity of orthogonal beam groups, a time-frequency resource to the first UE on which allocation is to be performed, wherein the second UE uses a same time-frequency resource representing a same time-frequency resource block (RB) or a same time-frequency resource block group (RBG) as the first UE.

2. The method according to claim 1, wherein measuring each beam in the preset quantity of orthogonal beam groups comprises:
   measuring, based on the uplink reference signal, each beam in the preset quantity of orthogonal beam groups, to determine an equivalent channel response of each beam; and
   determining the level of each beam based on the equivalent channel response of each beam.

3. The method according to claim 1, wherein determining, based on the level of each beam, a first beam attribute comprises:
   for each orthogonal beam group of the preset quantity of orthogonal bean groups, if a target beam satisfying a preset condition exists in the orthogonal beam groups, determining that the first beam attribute is the target beam.

4. The method according to claim 1, wherein time-frequency resources allocated to the first UE and the second UE are used for downlink transmission; and
   wherein allocating, based on the first beam attribute and the second beam attribute, a time-frequency resource, from the time-frequency resources, to the first UE comprises:
   determining a transmission mode of the first UE and a transmission mode of the second UE; and
   allocating the time-frequency resource to the first UE, based on:
   the transmission mode of the first UE,
   the transmission mode of the second UE,
   the first beam attribute, and
   the second beam attribute.

5. The method according to claim 4, wherein the allocating the time-frequency resource to the first UE comprises:
   allocating, to the first UE, the time-frequency resource that is also allocated to the second UE, in response to determining that the first UE and the second UE satisfy an orthogonal matching condition, which is determined based on the transmission mode of the first UE, the transmission mode of the second UE, the first beam attribute, and the second beam attribute.

6. The method according to claim 4, further comprising:
   if at least one of the first UE or the second UE uses a cell-specific reference signal (CRS)-based multiple-input multiple-output (MIMO) transmission mode, obtaining a physical cell identifier (PCI) of a cell to which the first UE belongs and a PCI of a cell to which the second UE belongs; and
   allocating, to the first UE, the time-frequency resource that is also allocated to the second UE, in response to determining that the first UE and the second UE satisfy an orthogonal matching condition, which is determined based on the first beam attribute, the second beam attribute, the PCI of the cell to which the first UE belongs, and the PCI of the cell to which the second UE belongs.

7. The method according to claim 6, wherein allocating, to the first UE, the time-frequency resource that is also allocated to the second UE comprises:
   allocating, to the first UE, the time-frequency resource that is also allocated to the second UE, in response to determining that the first UE and the second UE satisfy the orthogonal matching condition, wherein the determining is based on the transmission mode of the first UE is a MIMO transmission mode and the PCI of the cell to which the first UE belongs is different from the PCI of the cell to which the second UE belongs; or allocating, to the first UE, the time-frequency resource that is also allocated to the second UE, in response to determining that the first UE and the second UE satisfy the orthogonal matching condition, wherein the determining is based on the transmission mode of the first UE is a BF transmission mode, and the PCI of the cell to which the first UE belongs is different from the PCI of the cell to which the second UE whose transmission mode is a MIMO transmission mode belongs.

8. The method according to claim 5, wherein allocating, to the first UE, the time-frequency resource that is also allocated to the second UE comprises:
   allocating, to the first UE, the time-frequency resource that is also allocated to the second UE, in response to determining that the first UE and the second UE satisfy the orthogonal matching condition, wherein the determining is based on the transmission modes of the first UE and the second UE each are a BF transmission mode.

9. The method according to claim 1, wherein time-frequency resources allocated to the first UE and the second UE are used for uplink transmission; and
   wherein allocating a time-frequency resource, from the time-frequency resources, to the first UE comprises:
      allocating, to the first UE, the time-frequency resource that is also allocated to the second UE, in response to determining that the first UE and the second UE satisfy an orthogonal matching condition, which is determined based on the first beam attribute of the first UE and the second beam attribute of the second UE.

10. The method according to claim 9, wherein allocating, to the first UE, the time-frequency resource that is also allocated to the second UE comprises:
    obtaining a PCI of a cell to which the first UE belongs and a PCI of a cell to which the second UE belongs; and
    allocating, to the first UE, the time-frequency resource that is also allocated to the second UE, in response to determining that the first UE and the second UE satisfy the orthogonal matching condition, which is determined based on the PCI of the cell to which the first UE belongs, the PCI of the cell to which the second UE belongs, the first beam attribute of the first UE, and the second beam attribute of the second UE.

11. The method according to claim 10, wherein allocating, to the first UE, the time-frequency resource that is also allocated to the second UE comprises:
    allocating, to the first UE, the time-frequency resource that is also allocated to the second UE, in response to determining that the first UE and the second UE satisfy the orthogonal matching condition, wherein the determining is based on the PCI of the cell to which the first UE belongs is different from the PCI of the cell to which the second UE belongs.

12. A base station for time-frequency resource allocation, comprising:
    a processor configured to:
       obtain an uplink reference signal of a first user equipment (UE) on which allocation is to be performed, wherein the uplink reference signal comprises an uplink channel sounding reference signal (SRS) and/or a demodulation reference signal (DMRS);
       measure, based on the uplink reference signal, each beam in a preset quantity of orthogonal beam groups comprising a first preset quantity of beams, to determine a level of each beam;
       determine, based on the level of each beam, a first beam attribute of the first UE in the preset quantity of orthogonal beam groups; and
       allocate, based on the first beam attribute of the first UE and a second beam attribute that is of a second UE on which allocation has already been performed and that is in the preset quantity of orthogonal beam groups, a time-frequency resource to the first UE, wherein the second UE uses a same time-frequency resource representing a same time-frequency resource block (RB) or a same time-frequency resource block group (RBG) as the first UE.

13. The base station according to claim 12, wherein the processor is further configured to:
    measure, based on the uplink reference signal, each beam in the preset quantity of orthogonal beam groups comprising the first preset quantity of beams, to determine an equivalent channel response of each beam; and
    determine the level of each beam based on the equivalent channel response of each beam.

14. An apparatus for time-frequency resource allocation, comprising:
    a processor configured to:
       obtain an uplink reference signal of a first user equipment (UE) on which allocation is to be performed, wherein the uplink reference signal comprises an uplink channel sounding reference signal (SRS) and/or a demodulation reference signal (DMRS);
       measure, based on the uplink reference signal, each beam in a preset quantity of orthogonal beam groups comprising a first preset quantity of beams, to determine a level of each beam; and determine, based on the level of each beam, a first beam attribute of the first UE; and
       allocate, based on the first beam attribute of the first UE and a second beam attribute that is of a second UE on which allocation has already been performed and that is in the preset quantity of orthogonal beam groups, a time-frequency resource to the first UE, wherein the second UE uses a same time-frequency resource representing a same time-frequency resource block (RB) or a same time-frequency resource block group (RBG) as the first UE.

15. The apparatus according to claim 14, wherein the processor is further configured to:
    measure, based on the uplink reference signal, each beam in the preset quantity of orthogonal beam groups comprising the first preset quantity of beams, to determine an equivalent channel response of each beam; and
    determine the level of each beam based on the equivalent channel response of each beam.

16. The apparatus according to claim 14, wherein the processor is further configured to:
    for each orthogonal beam group of the preset quantity of orthogonal bean groups, if a target beam satisfying a preset condition exists in the orthogonal beam groups, determine that the first beam attribute of the first UE is the target beam.

17. The apparatus according to claim 14, wherein time-frequency resources allocated to the first UE and the second UE are used for downlink transmission; and
    the processor is further configured to:
       determine a transmission mode of the first UE and a transmission mode of the second UE; and
       allocate, based on the transmission mode of the first UE, the transmission mode of the second UE, the first beam attribute of the first UE, and the second beam attribute of the second UE, the time-frequency resource to the first UE.

18. The apparatus according to claim 17, wherein the processor is further configured to:
allocate, to the first UE, the time-frequency resource that is also allocated to the second UE, in response to determining that the first UE and the second UE satisfy an orthogonal matching condition, which is determined based on the transmission mode of the first UE, the transmission mode of the second UE, the first beam attribute of the first UE, and the second beam attribute of the second UE.

19. The apparatus according to claim 17, wherein the processor is further configured to:
if at least one of the first UE or the second UE uses a multiple-input multiple-output (MIMO) transmission mode, obtain a physical cell identifier (PCI) of a cell to which the first UE belongs and a PCI of a cell to which the second UE belongs; and
allocate, to the first UE, the time-frequency resource that is also allocated to the second UE, in response to determining that the first UE and the second UE satisfy an orthogonal matching condition, which is determined based on the first beam attribute of the first UE, the second beam attribute of the second UE, the PCI of the cell to which the first UE belongs, and the PCI of the cell to which the second UE belongs.

20. The apparatus according to claim 19, wherein the processor is further configured to:
allocate, to the first UE, the time-frequency resource that is also allocated to the second UE, in response to determining that the first UE and the second UE satisfy the orthogonal matching condition, wherein the determining is based on the transmission mode of the first UE is a MIMO transmission mode and the PCI of the cell to which the first UE belongs is different from the PCI of the cell to which the second UE belongs; or
allocate, to the first UE, the time-frequency resource that is also allocated to the second UE, in response to determining that the first UE and the second UE satisfy the orthogonal matching condition, wherein the determining is based on the transmission mode of the first UE is a BF transmission mode, and the PCI of the cell to which the first UE belongs is different from the PCI of the cell to which the second UE whose transmission mode is a MIMO transmission mode belongs.

* * * * *